US011563976B2

(12) United States Patent
Wang et al.

(10) Patent No.: US 11,563,976 B2
(45) Date of Patent: Jan. 24, 2023

(54) DEVICES AND METHODS FOR IMAGE AND VIDEO CODING

(71) Applicant: Huawei Technologies Co., Ltd., Guangdong (CN)

(72) Inventors: Biao Wang, Shenzhen (CN); Jianle Chen, Santa Clara, CA (US); Semih Esenlik, Munich (DE); Anand Meher Kotra, Munich (DE); Han Gao, Munich (DE); Zhijie Zhao, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/170,065

(22) Filed: Feb. 8, 2021

(65) Prior Publication Data
US 2021/0176493 A1 Jun. 10, 2021

Related U.S. Application Data

(63) Continuation of application No. PCT/CN2019/110075, filed on Oct. 9, 2019.
(Continued)

(51) Int. Cl.
H04N 19/593 (2014.01)
H04N 19/105 (2014.01)
(Continued)

(52) U.S. Cl.
CPC ......... *H04N 19/593* (2014.11); *H04N 19/105* (2014.11); *H04N 19/159* (2014.11); *H04N 19/176* (2014.11)

(58) Field of Classification Search
CPC ............. A61M 5/31511; H04N 19/105; H04N 19/159; H04N 19/176; H04N 19/593
See application file for complete search history.

(56) References Cited

U.S. PATENT DOCUMENTS

2013/0114707 A1   5/2013  Seregin et al.
2014/0064359 A1*  3/2014  Rapaka .................. H04N 19/11
                                                    375/240.02
(Continued)

FOREIGN PATENT DOCUMENTS

CN   103891283 A   6/2014
CN   107925759 A   4/2018
(Continued)

OTHER PUBLICATIONS

Benjamin Brass et al., CE3: Multiple reference line intra prediction (Test 5.4.1, 5.4.2, 5.4.3 and 5.4.4). Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0051-v1, 8 pages.
(Continued)

*Primary Examiner* — Md N Haque
(74) *Attorney, Agent, or Firm* — Womble Bond Dickinson (US) LLP

(57) ABSTRACT

The disclosure relates to a method of decoding implemented by a decoding device, comprising: obtaining a value of a reference line index for a current block; constructing a most probable mode, MPM, list for the current block; obtaining a value of intra-prediction mode index for the current block; when the value of the reference line index is not equal to 0, obtaining an intra prediction mode of the current block according to the MPM list for the current block and the value of the intra-prediction mode index for the current block, wherein the value of the intra-prediction mode index indicates a position that corresponds to the intra prediction mode of the current block among angular intra-prediction modes in the MPM list. The disclosure also relates to a coding apparatus and a non-transitory machine-readable medium.

6 Claims, 19 Drawing Sheets

Related U.S. Application Data

(60) Provisional application No. 62/755,417, filed on Nov. 2, 2018, provisional application No. 62/744,122, filed on Oct. 10, 2018, provisional application No. 62/743,543, filed on Oct. 9, 2018.

(51) Int. Cl.
 H04N 19/159 (2014.01)
 H04N 19/176 (2014.01)

(56) References Cited

U.S. PATENT DOCUMENTS

| | | | |
|---|---|---|---|
| 2016/0373769 A1* | 12/2016 | Zhao | H04N 19/176 |
| 2017/0332084 A1* | 11/2017 | Seregin | H04N 19/176 |
| 2017/0347093 A1 | 11/2017 | Yu et al. | |
| 2017/0347103 A1 | 11/2017 | Yu et al. | |
| 2019/0089952 A1* | 3/2019 | Liu | H04N 19/46 |
| 2019/0238841 A1* | 8/2019 | Lee | H04N 19/80 |
| 2020/0275124 A1* | 8/2020 | Ko | H04N 19/176 |

FOREIGN PATENT DOCUMENTS

| | | | |
|---|---|---|---|
| WO | 2017176030 A1 | 10/2017 | |
| WO | 2017190288 A1 | 11/2017 | |

OTHER PUBLICATIONS

Mohammed Golam Sarwer et al., CE3-related: Intra mode coding. Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0243-V2, 8 pages.

Po-Han Lin et al., CE3: Number of extended reference line for intra prediction (Test 5.5.1 and 5.5.2). Joint Video Exploration Team (JVET) of ITU-T SG 16 WP 3 and ISO/IEC JTC 1/SC 29/WG 11, 11th Meeting: Ljubljana, SI, Jul. 10-18, 2018, JVET-K0277, 3 pages.

Liang Zhao et al., CE3: Mode dependent reference line selection (Test 5.1.1 and 5.1.2) . Joint Video Exploration Team (JVET) of ITU-T SG 16 WP 3 and ISO/IEC JTC 1/SC 29/WG 11, 11th Meeting: Ljubljana, SL, Jul. 10-20, 2018, JVET-K0284, 3 pages.

Benjamin Brass et al., CE3: Multiple reference line intra prediction (Test 1.1.1, 1.1.2, 1.1.3 and 1.1.4). Joint Video Experts Team (JVET) of ITU-T SG 16 WP 3 and ISO/IEC JTC 1/SC 29/WG 11, 12th Meeting: Macao, CN, Oct. 3-12, 2018, JVET-L0283-v2, 7 pages.

Biao Wang et al., CE3-related: Harmonization of MPM list construction. Joint Video Experts Team (JVET) of ITU-T SG 16 WP 3 and ISO/IEC JTC 1/SC 29/WG 11, 13th Meeting: Marrakesh, Morocco, Jan. 9-18, 2019, JVET-M0295, 4 pages.

Li Zhang et al., Position dependent linear intra prediction for image coding, 2010 IEEE International Conference on Image Processing, Sep. 26-29, 2010, Hong Kong, pp. 2877-2880 (4 pages total).

ITU-T H.264 (Apr. 2017), Series H: Audiovisual and Multimedia Systems, Infrastructure of audiovisual services—Coding of moving video, Advanced video coding for generic audiovisual services, 812 pages.

ITU-T H.265 (Feb. 2018), Series H: Audiovisual and Multimedia Systems, Infrastructure of audiovisual services—Coding of moving video, High efficiency video coding, 692 pages.

Gary J. Sullivan et al., Overview of the High Efficiency Video Coding (HEVC) Standard, IEEE Transactions on Circuits and Systems for Video Technology, vol. 22, No. 12, Dec. 2012, pp. 1649-1668 (20 pages total).

Huan Yi et al., "The Optimization of HEVC Intra Prediction Mode Selection", 2017 4th International Conference on Information Science and Control Engineering, total: 2017 IEEE, 6 pages.

Li Yuan et al., "Fast Intra Prediction Algorithm for HEVC Based on Temporal Correlation", videoe.2013.09.007, total: 5 pages.

\* cited by examiner

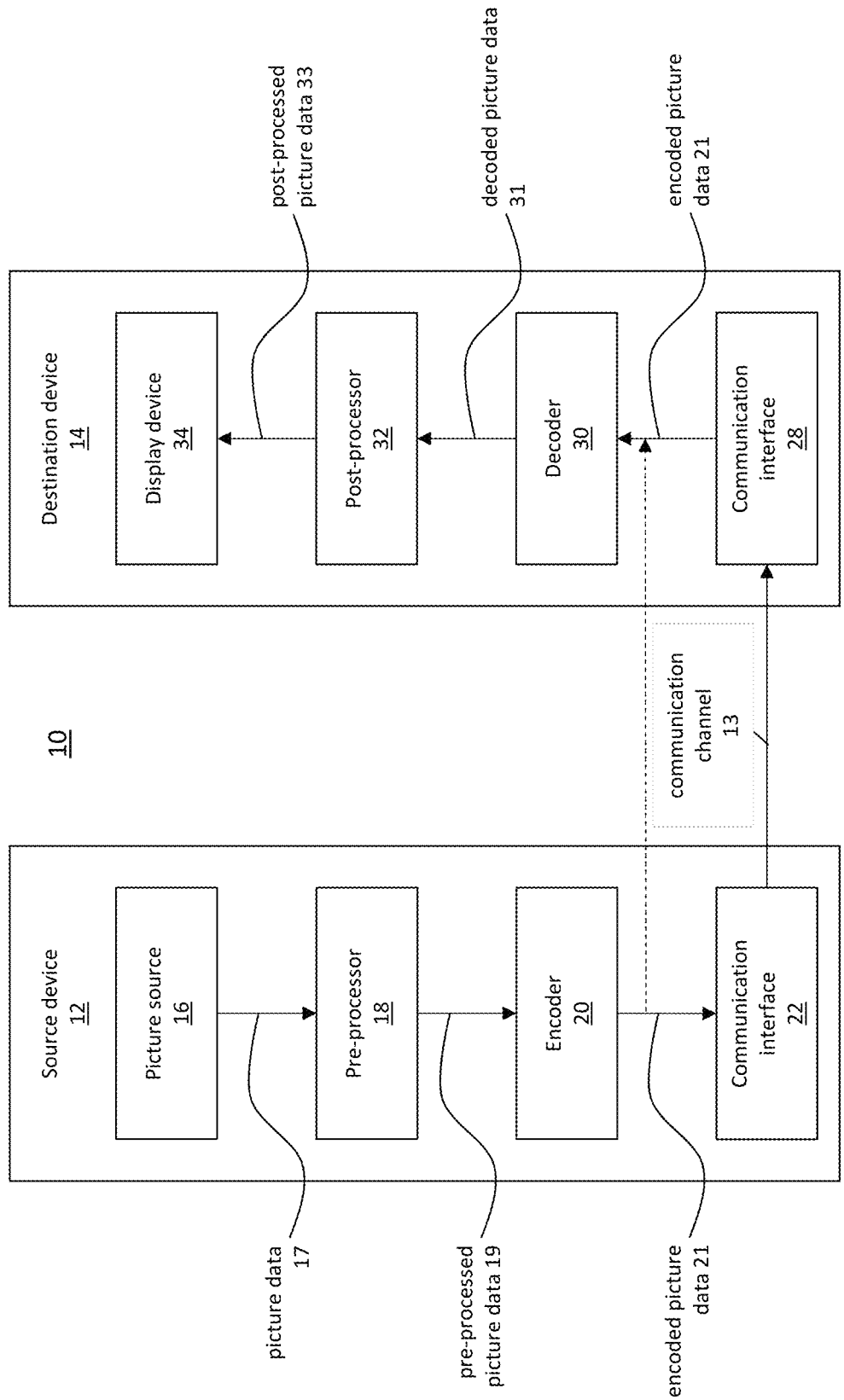

| Intra prediction modes | MPM flag | Selected flag | Bit string |
|---|---|---|---|
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

Fig. 11

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP | intra prediction modes applied to a block

Fig. 12

DEVICES AND METHODS FOR IMAGE AND VIDEO CODING

CROSS-REFERENCE TO RELATED APPLICATIONS

This application is a continuation of International Application No. PCT/CN2019/110075, filed on Oct. 9, 2019, which claims priority from U.S. provisional Application No. 62/743,543, filed on Oct. 9, 2018, U.S. provisional Application No. 62/744,122, filed on Oct. 10, 2018, and U.S. provisional Application No. 62/755,417, filed on Nov. 2, 2018, the disclosures of which are incorporated herein by reference in their entireties.

TECHNICAL FIELD

The application relates to the field of image or video coding. More specifically, the application relates to an apparatus and a method for intra prediction of a picture block, and an encoding apparatus and a decoding apparatus comprising such an intra prediction apparatus.

BACKGROUND

Digital video communication and storage applications are implemented by a wide range of digital devices, e.g., digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason, support of video coding standards is a mandatory requirement for almost any video compression application.

Normally, video coding standards are based on partitioning of a source picture into picture blocks. Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed.

Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2: 2013, "Information technology—High efficiency coding and media delivery in heterogeneous environments—Part 2: High efficiency video coding", November 2013) declares a set of video coding tools that provide a reasonable tradeoff between coding efficiency and computational complexity.

An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similar to the ITU-T H.264/AVC video coding standard, the HEVC/H.265 video coding standard provides for a division of the source picture into picture blocks, in the form of so-called coding units (CUs). The term "picture block" in this disclosure is used as a synonym for coding unit or coding block. Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation, using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress.

In the H.264/AVC standard, four intra-prediction modes are available for 16×16 blocks for a luma color component. According to the HEVC/H.265 standard, 35 intra prediction modes are available and include a planar mode (the intra-prediction mode index is 0), a DC mode (the intra-prediction mode index is 1), and 33 directional or angular modes (the intra-prediction mode index ranges from 2 to 34).

As of version 1.0 of the JEM software, the set of directional intra-prediction modes has been extended to 65 modes (almost doubled) by decreasing the step angle between the neighboring directional intra-prediction modes by a factor of 2. This increase to 67 intra-prediction modes in total would result in a significant signaling overhead and, thus, reduced coding efficiency since the intra-prediction mode for predicting a picture block is derived at the encoder and needs to be signaled to the decoder. Thus, in order to reduce the signaling overhead, the following intra prediction mode coding scheme has been suggested based on a most probable mode (MPM) list (or set) containing 6 of the 67 intra prediction modes or containing 3 of the 67 intra prediction modes.

Thus, there is a need for improved devices and methods for video coding, which allow increasing the coding efficiency for intra prediction.

SUMMARY

It is an object of the application to provide improved devices and methods for video coding, which allow increasing the coding efficiency for intra prediction.

The foregoing and other objects are achieved by the subject matter of the independent claims. Further embodiments are apparent from the dependent claims, the description and the figures.

According to a first aspect, a method of video decoding implemented by a decoding device is provided. The method comprises obtaining a value of a reference line index for a current block. The method further comprises constructing a most probable mode (MPM) list for the current block. The method further comprises obtaining a value of intra-prediction mode index for the current block. When the value of the reference line index is not equal to 0, the method comprises obtaining an intra prediction mode of the current block according to the MPM list for the current block and the value of the intra-prediction mode index for the current block, where the value of the intra-prediction mode index indicates a position that corresponds to the intra prediction mode of the current block among angular intra-prediction modes in the MPM list. The method further comprises obtaining prediction values for the current block according to the intra prediction mode of the current block and reference samples of neighboring blocks adjacent to the current block. The method further comprises obtaining reconstructed sample values of the current block according to the prediction values for the current block.

In an embodiment of the first aspect, the processing unit is further configured to predict sample values of the current picture block using the adopted intra prediction mode and to provide a predicted picture block.

In an embodiment of the first aspect, the plurality of intra prediction modes comprise the plurality of intra prediction modes defined in the HEVC/H.265 standard or a standard evolved therefrom. In an implementation form the most probable modes list comprises 6 different intra prediction modes.

According to a second aspect, an encoding apparatus for encoding a current picture block of a picture is provided. The current picture block comprises a plurality of samples, each sample being associated with a sample value. The encoding apparatus comprises: an intra prediction apparatus for providing a predicted picture block; and an encoding unit configured to encode the current picture block on the basis of the predicted picture block and the adopted intra prediction mode.

Thus, an improved encoding apparatus for image and video coding is provided, which allows increasing the encoding efficiency for intra prediction.

According to a third aspect, a decoding apparatus for decoding an encoded picture block of a picture is provided. The encoded picture block comprises a plurality of samples, each sample being associated with a sample value. The decoding apparatus comprises: an intra prediction apparatus for providing a predicted picture block; and a restoration unit configured to restore a picture block on the basis of an encoded adopted intra prediction mode, an encoded picture block and the predicted picture block.

Thus, an improved decoding apparatus for image and video coding is provided, which allows increasing the decoding efficiency for intra prediction.

According to a fourth aspect, an intra prediction method is provided. The intra prediction method can be performed by the intra prediction apparatus according to the first aspect. Further features of the intra prediction method result directly from the functionality of the intra prediction apparatus according to the first aspect and its different embodiments.

According to a fifth aspect, an apparatus for decoding a video stream includes a processor and a memory is provided. The memory stores instructions that cause the processor to perform the method according to the first aspect.

According to a sixth aspect, an apparatus for encoding a video stream includes a processor and a memory is provided. The memory stores instructions that cause the processor to perform the method according to the second aspect.

According to a seventh aspect, a computer-readable storage medium having stored thereon instructions that when executed, causes one or more processors configured to code video data is provided. The instructions cause the one or more processors to perform a method according to the first or second aspect or any embodiment of the first or second aspect.

According to an eighth aspect, a computer program is provided. The computer program comprises program code for performing the method according to the first or second aspect or any embodiment of the first or second aspect when executed on a computer.

Details of one or more embodiments are set forth in the accompanying drawings and the description below. Other features, objects, and advantages will be apparent from the description, drawings, and claims.

Embodiments of the disclosure can be implemented in hardware and/or software.

BRIEF DESCRIPTION OF THE DRAWINGS

In the following embodiments of the disclosure are described in more detail with reference to the attached figures and drawings, in which:

FIG. 1A is a block diagram showing an example of a video coding system according to an embodiment.

FIG. 11 shows a table illustrating an example about intra prediction mode signaling scheme.

FIG. 12 shows some examples about a mapping relationship between index values and intra prediction modes.

Figure 1B:
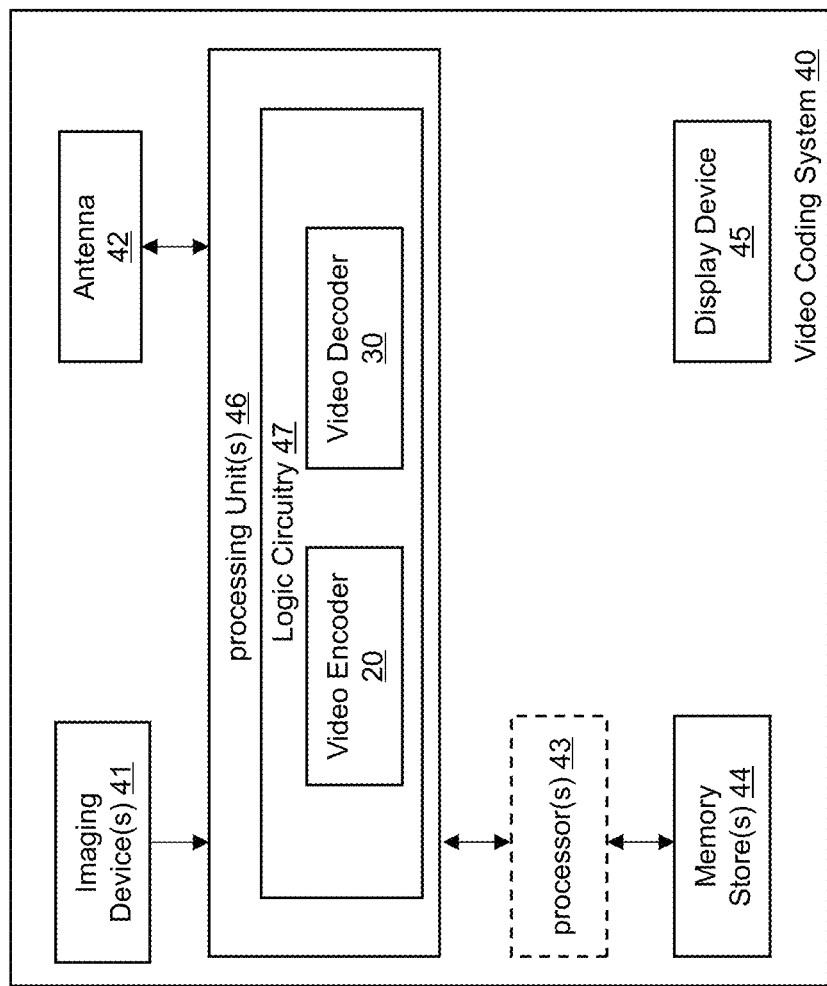
FIG. 1B is a block diagram showing another example of a video coding system according to an embodiment.

In the various figures, identical reference signs will be used for identical or at least functionally equivalent features.

DETAILED DESCRIPTION OF THE EMBODIMENTS

Definitions of Acronyms & Glossary

CTU/CTB—Coding Tree Unit/Coding Tree Block
CU/CB—Coding Unit/Coding Block
PU/PB—Prediction Unit/Prediction Block
TU/TB—Transform Unit/Transform Block
HEVC—High Efficiency Video Coding In the following description, reference is made to the accompanying figures, which form part of the disclosure, and which show, by way of illustration, specific aspects of embodiments of the application or specific aspects in which embodiments of the present application may be used. It is understood that embodiments of the application may be used in other aspects and comprise structural or logical changes not depicted in the figures. The following detailed description, therefore, is not to be taken in a limiting sense, and the scope of the present application is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts, i.e. video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system (or coding system) that may utilize techniques described herein. Video encoder (or encoder) 20 and video decoder (or decoder) 30 of coding system 10 represent examples of devices that may be configured to perform techniques in accordance with various examples described in the present application.

As shown in FIG. 1A, the coding system 10 comprises a source device 12 configured to provide encoded picture data 21, e.g. to a destination device 14, for decoding the encoded picture data 21.

The source device 12 comprises an encoder 20, and may additionally or optionally, comprise a picture source 16, a pre-processor (or pre-processing unit) 18, e.g. a picture pre-processor, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described herein below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder), and may additionally or optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments, the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g. a video encoder) and the decoder 30 (e.g. a video decoder) each may be implemented as any of a variety of suitable circuitry as shown in FIG. 1B, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some embodiments, coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 2:
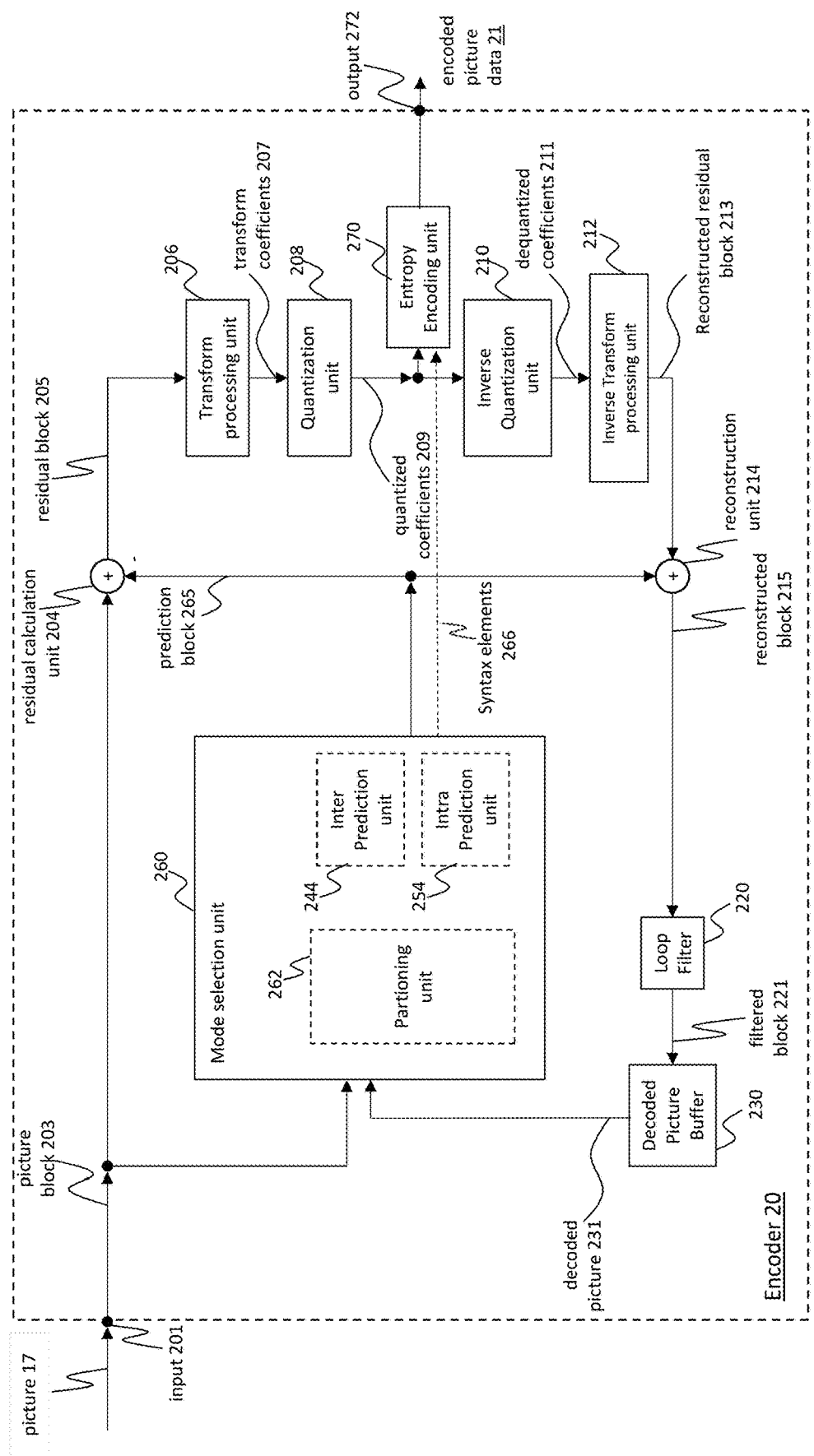
FIG. 2 is a block diagram showing an example of a video encoder according to an embodiment.
Figure 3:
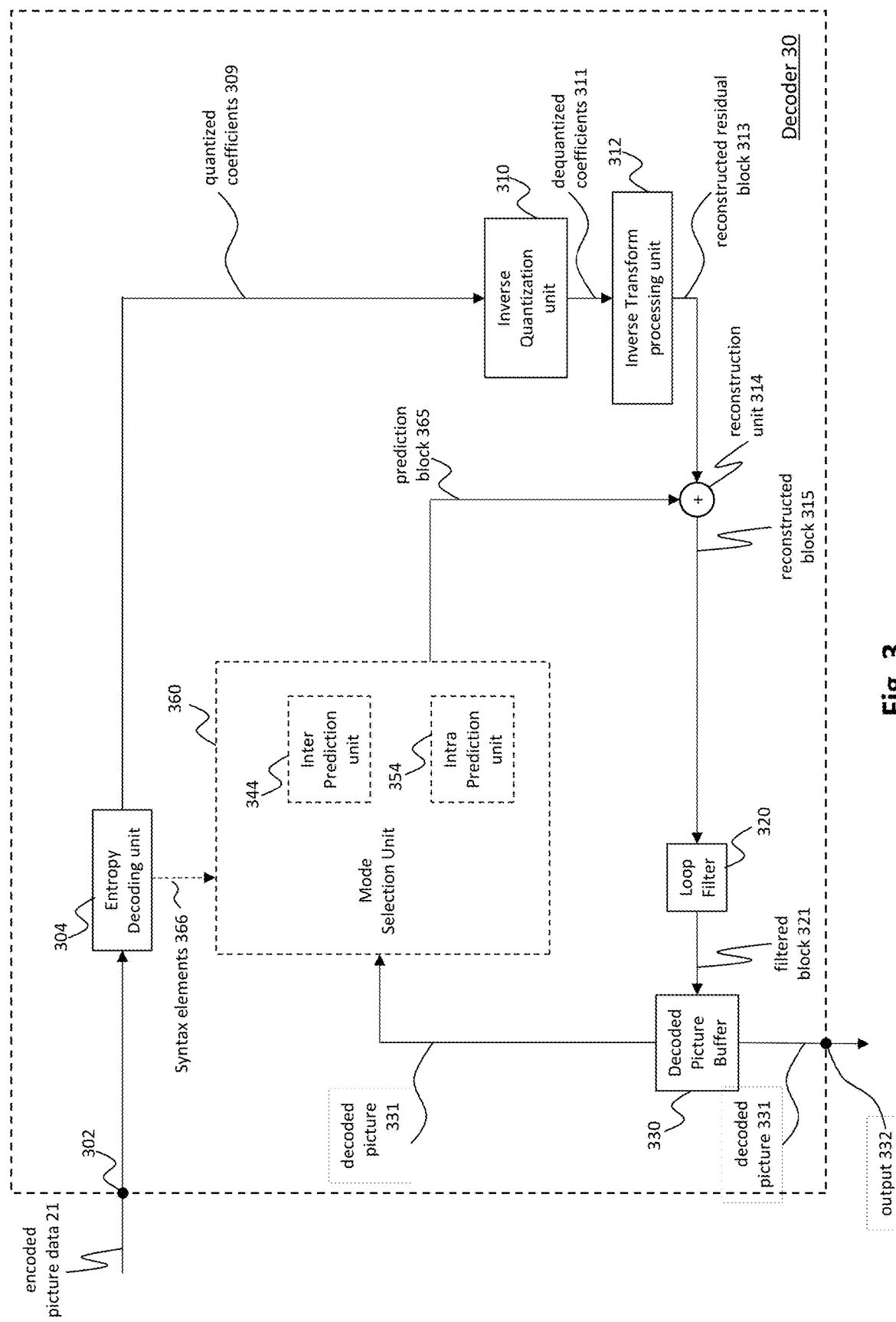
FIG. 3 is a block diagram showing an example structure of a video decoder according to an embodiment.

FIG. 1B is an illustrative diagram of another example video coding system 40 including encoder 20 of FIG. 2 and/or decoder 30 of FIG. 3 according to an embodiment.

The system 40 can implement techniques in accordance with various embodiments described in the present application. In the illustrated embodiment, video coding system 40 may include imaging device(s) 41, video encoder 20, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various embodiments.

As shown, in some embodiments, video coding system 40 may include antenna 42. Antenna 42 may be configured to transmit or receive an encoded bitstream of video data, for example. Further, in some embodiments, video coding system 40 may include display device 45. Display device 45 may be configured to present video data. As shown, in some embodiments, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include processor(s) 43, which may similarly include application-specific integrated circuit (ASIC) logic, graphics processor(s), general purpose processor(s), or the like. In some embodiments, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some embodiments, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some embodiments, video encoder 20 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 20 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some embodiments, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some embodiments, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

For convenience of description, embodiments are described herein, for example, by reference to High-Efficiency Video Coding (HEVC) or to the reference software of Versatile Video coding (WC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that the embodiments are not limited to HEVC or WC.

Encoder and Encoding Method

FIG. 2 shows a schematic block diagram of an example video encoder 20 that is configured to implement the techniques of the present application. In the example of FIG. 2, the video encoder 20 comprises an input (or input interface) 201, a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture (or picture data) 17, e.g. picture of a sequence of pictures forming a video or video sequence. The received picture or picture data may also be a pre-processed picture (or pre-processed picture data) 19 of FIG. 1A. For sake of simplicity the following description refers to as picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

In some embodiments, the video encoder 20, as shown in FIG. 2, may be configured encode the picture 17 block by block, e.g. the encoding and prediction is performed per block 203.

Residual Calculation

The residual calculation unit 204 may be configured to calculate a residual block 205 (also referred to as residual) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In an embodiment, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer) is configured to add the reconstructed residual block 213 (i.e. transformed block) to the prediction block 265 to obtain a reconstructed block 215 in the sample domain, e.g. by adding—sample by sample—the sample values of the reconstructed residual block 213 and the sample values of the prediction block 265.

Filtering

The loop filter unit (or loop filter) 220 is configured to filter the reconstructed block 215 to obtain a filtered block 221, or in general, to filter reconstructed samples to obtain filtered samples. The loop filter unit 220 is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 220 is shown in FIG. 2 as being an in loop filter, in other embodiments, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and WC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (WC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for WC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder according to an embodiment. Video decoder 30 is configured to receive encoded picture data 21 (e.g. encoded bitstream), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer), a loop filter 320, a decoded picture buffer (DBP) 330, an inter prediction unit 344 and an intra prediction unit 354. Inter prediction unit 344 may be or include a motion compensation unit. Video decoder 30 may, in some embodiments, perform a decoding pass generally reciprocal to the encoding pass described with respect to video encoder 20 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder 20 apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients, and to apply a transformation to the dequantized coefficients 311 in order to obtain reconstructed residual blocks 213 in the sample domain. The reconstructed residual blocks 213 may also be referred to as transform blocks 313. The transformation may be an inverse transformation, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 331, e.g. via output 332, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
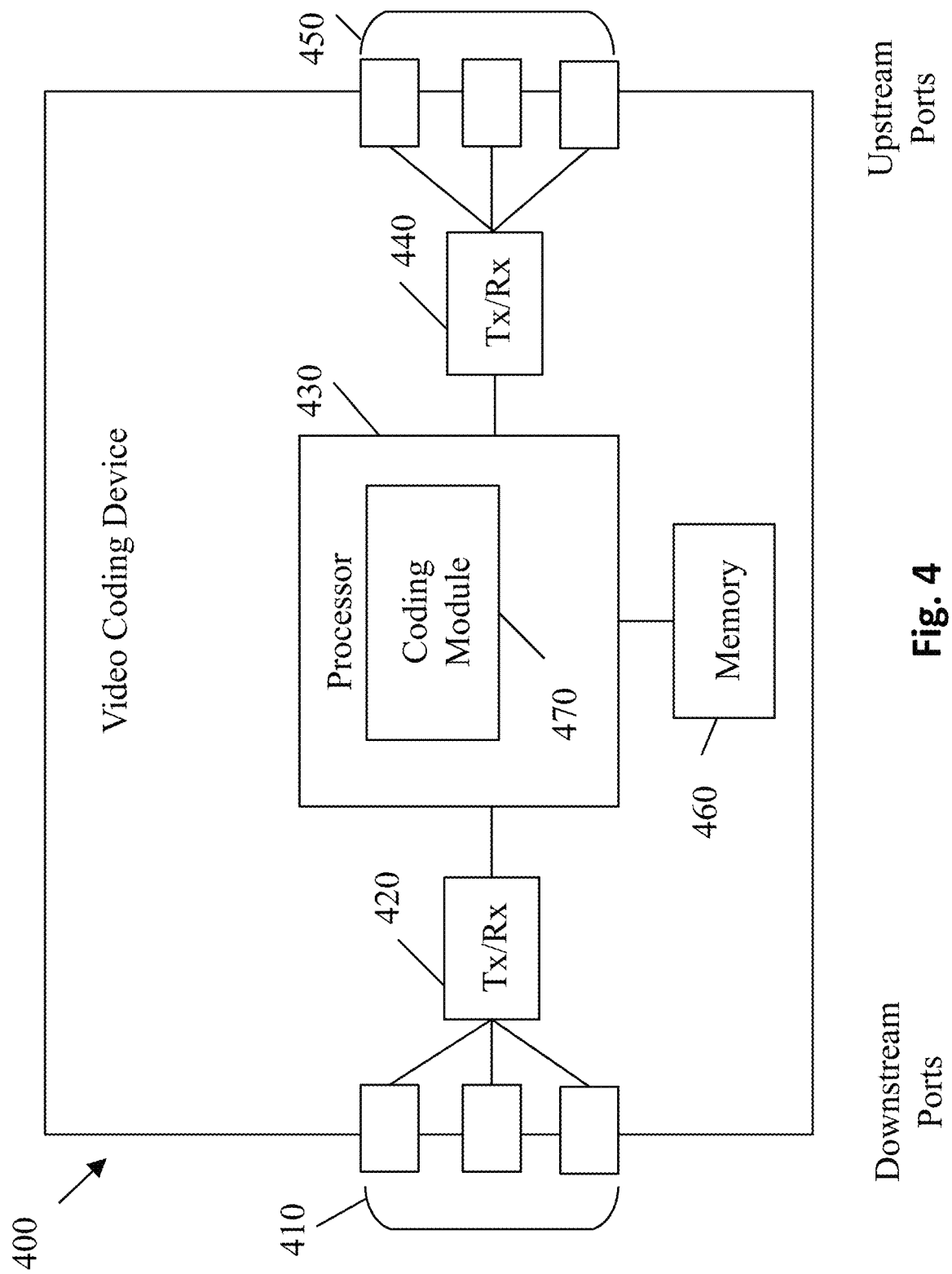
FIG. 4 is a block diagram illustrating an example of an encoding apparatus or a decoding apparatus.

FIG. 4 is a schematic diagram of a video coding device 400 according to an embodiment. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) or processor 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460.

The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
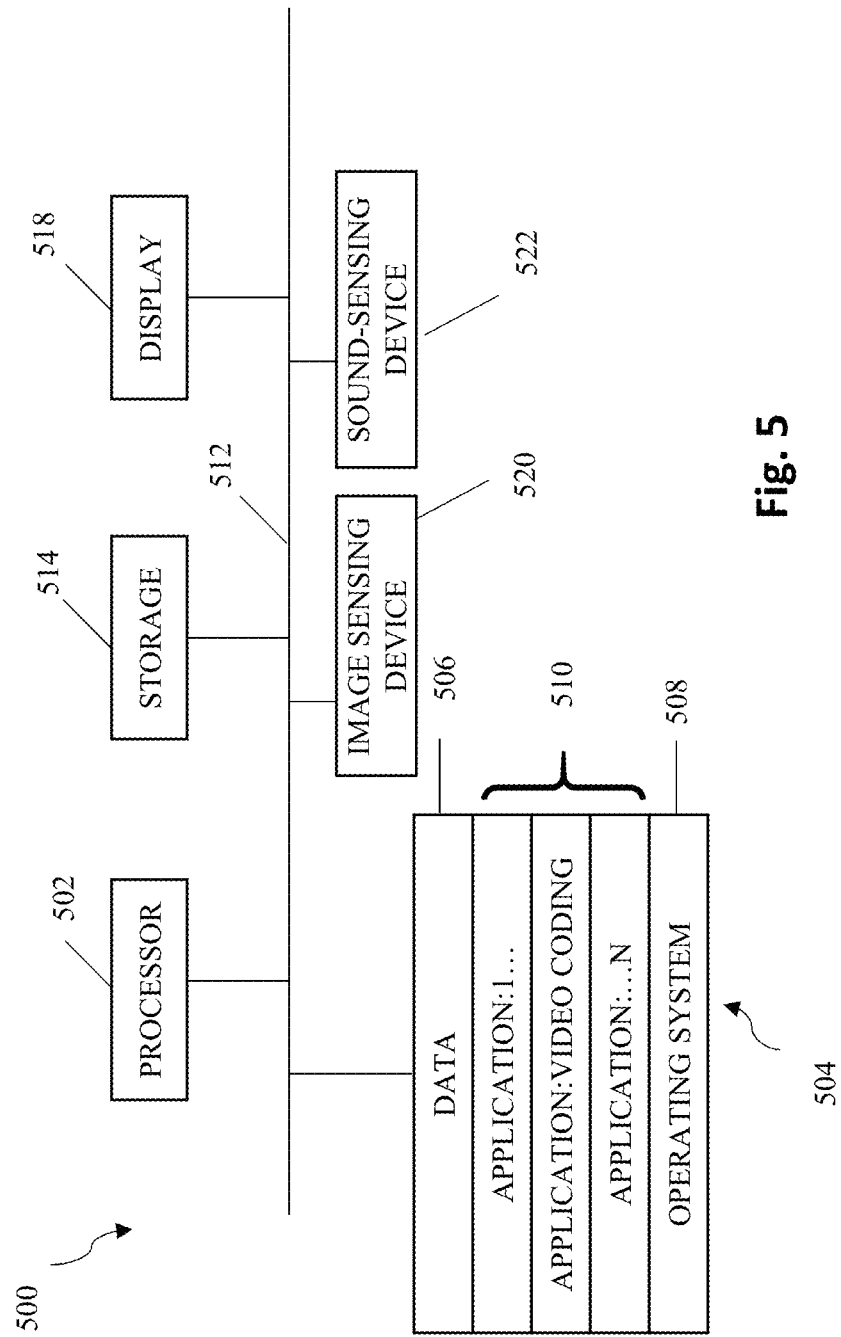
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an embodiment. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Various video coding standards include predictive coding modes for video blocks, where a block currently being coded is predicted based on an already coded block of video data. In an intra prediction mode, the current block is predicted based on one or more previously coded, neighboring blocks in the same picture as the current block.

Figure 6:
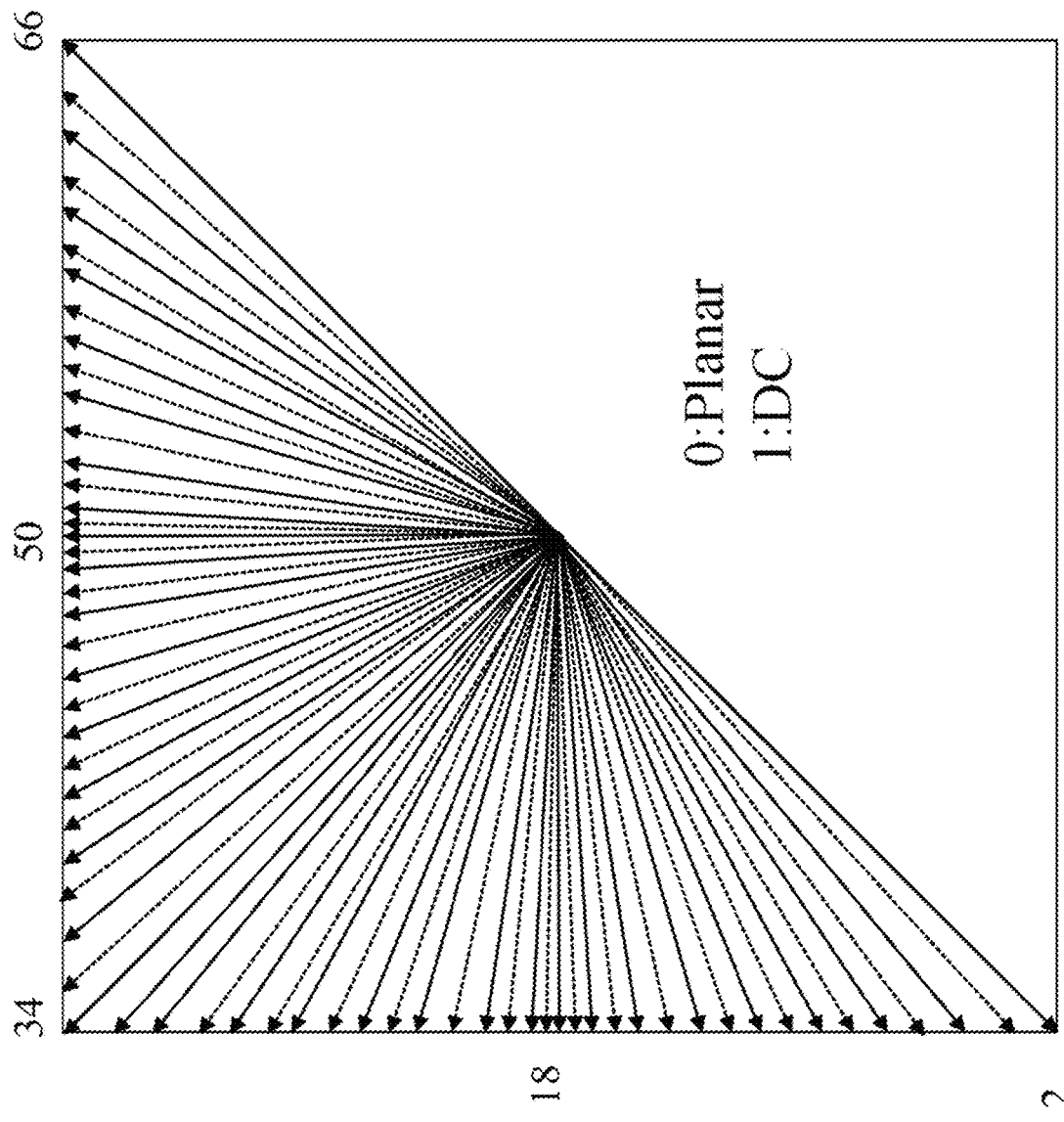
FIG. 6 shows a diagram illustrating a plurality of intra prediction modes implemented in an apparatus according to an embodiment.

To capture the arbitrary edge directions presented in natural video, the number of directional or angular intra modes is extended from 33, as used in HEVC, to 65. The additional directional modes are depicted as dotted arrows in FIG. 6, and the planar and DC modes remain the same. These denser directional intra prediction modes may apply for all block sizes and for both luma and chroma intra predictions. For example, the respective angular intra prediction mode may be identified by the intra prediction mode index, for example, the intra prediction mode index 2, 18, 34, 50 and/or 66, i.e. the directional modes pointing to the bottom left corner (2), horizontally to the left (18), to the top left corner (34), vertically to the top (50) and to the top right corner (66).

Figure 7:
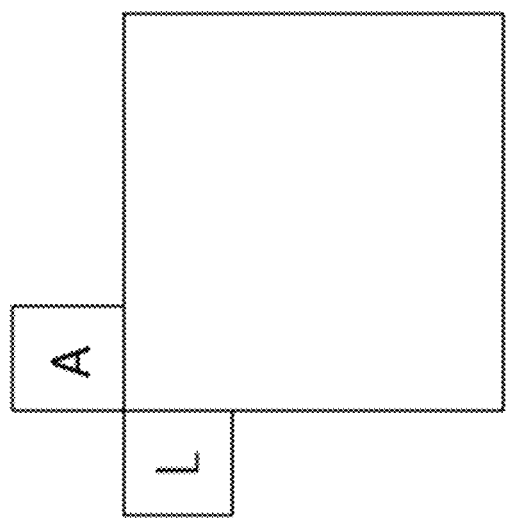
FIGS. 7-8 show examples of neighbor blocks according to an embodiment.

The 3 MPM mode list only considers intra modes of two spatial neighbors L and A as shown in FIG. 7.

Figure 8:
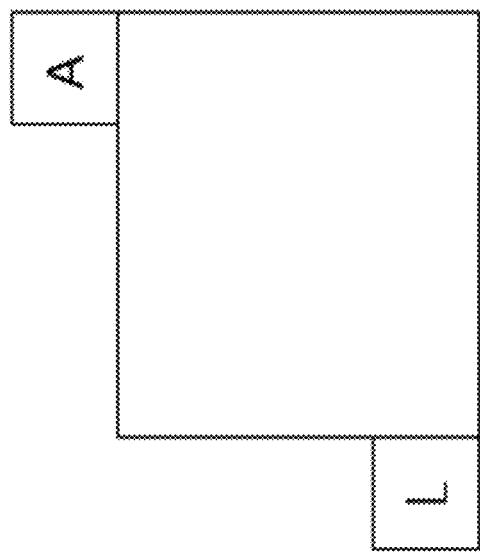

The MPM list is expanded to 6 intra modes, and only the left and above neighboring blocks as shown in FIG. 8, are considered in 6 MPM list. In other words, two neighboring intra modes (left and above) are deployed for MPM list generation.

An Intra mode coding method with 6. Most Probable Modes (MPMs) list is used. Two major technical aspects are involved.

1) the derivation of 6 MPMs, and
2) entropy coding of 6 MPMs and non-MPM modes.

Only the left and above neighboring blocks as shown in FIG. 8, are considered for construction of the 6 MPM list. A pruning process is used to remove the duplicated modes so that only unique modes are included into the MPM list. The order in which the initial modes are included is left, above, planar, DC, below left, above right, and above left.

If the MPM list is not full (i.e. has less than 6 MPM candidates in the list), derived modes are added, those intra modes are obtained by adding −1 or +1 to the angular modes which are already included in the MPM list. Derivation is not applied to non-angular modes, i.e. DC or planar.

Finally, if the MPM list is still not complete, the default modes are added in the order of: vertical, horizontal, intra mode 2, and diagonal mode. As a result of this process, a unique list of 6 MPM modes is generated.

For entropy coding of 6 MPMs, a truncated unary binarization of the MPMs is used.

Embodiments of the disclosure will be described as below in details:

Further embodiments of the present disclosure will be described in the following.

Figure 9:
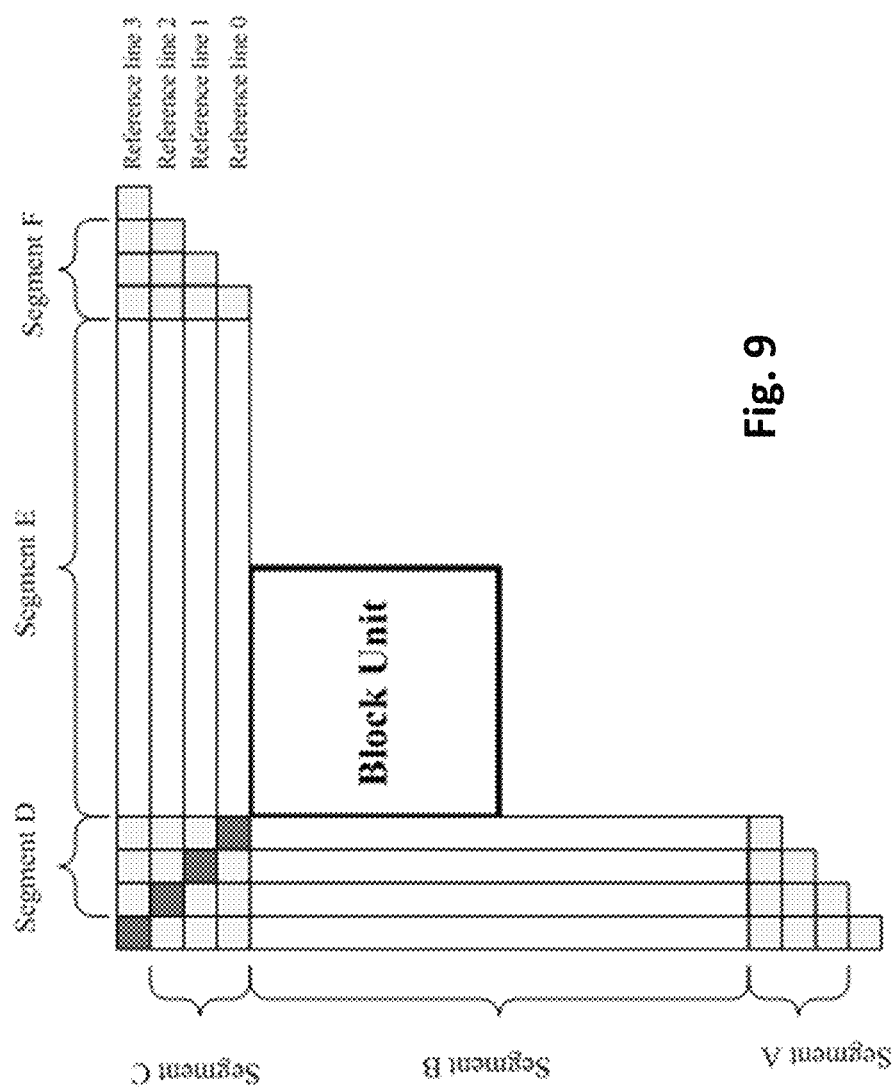
FIG. 9 shows four reference lines adjacent to a coding block unit.

FIG. 9 illustrates multi-reference line intra prediction (MRL), two additional reference lines are used, and reference line index is signaled.

Multiple reference line (MRL) intra prediction is to use more reference lines for intra prediction. An index of selected reference line (mrl_idx) is signaled and used to generate intra predictor. The reference line index is signaled before intra prediction modes, and Planar and DC modes are excluded from intra prediction modes in case a non-zero reference line index is signaled. In FIG. 9, an example of 4 reference lines is depicted, where the samples of segments A and F are not fetched from reconstructed neighboring samples but padded with the closest samples from Segment B and E, respectively.

6-MPM (Most Probable Modes) approach may be used in intra mode coding. The current code block's intra prediction is probably picked up from the 6 MPM list. This approach assures two non-angular modes (i.e. Planar and DC, corresponding to value 0 and 1, respectively) always exist after the MPM construction. After intra mode is derived, the VVC codec would use this mode and reference samples from neighboring blocks to perform intra prediction. Conventionally, there is only one line of reference samples are used for intra prediction.

To improve coding efficiency, a method for intra prediction using multiple reference sample lines and a 6-MPM (Most Probable Modes) list is provided in the embodiments of the disclosure. In some embodiments, the reference sample line may be picked up from one of the four nearest lines of the neighboring blocks, as shown in FIG. 9.

Figure 10:
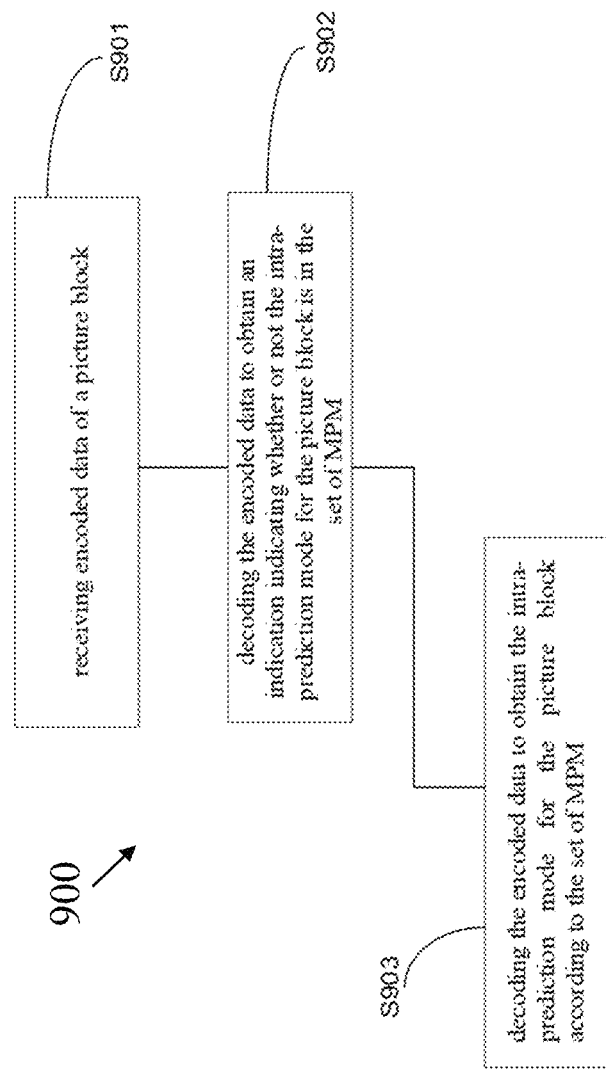
FIG. 10 shows a flowchart refers to obtain an intra-prediction mode according to an example.
Figure 13:
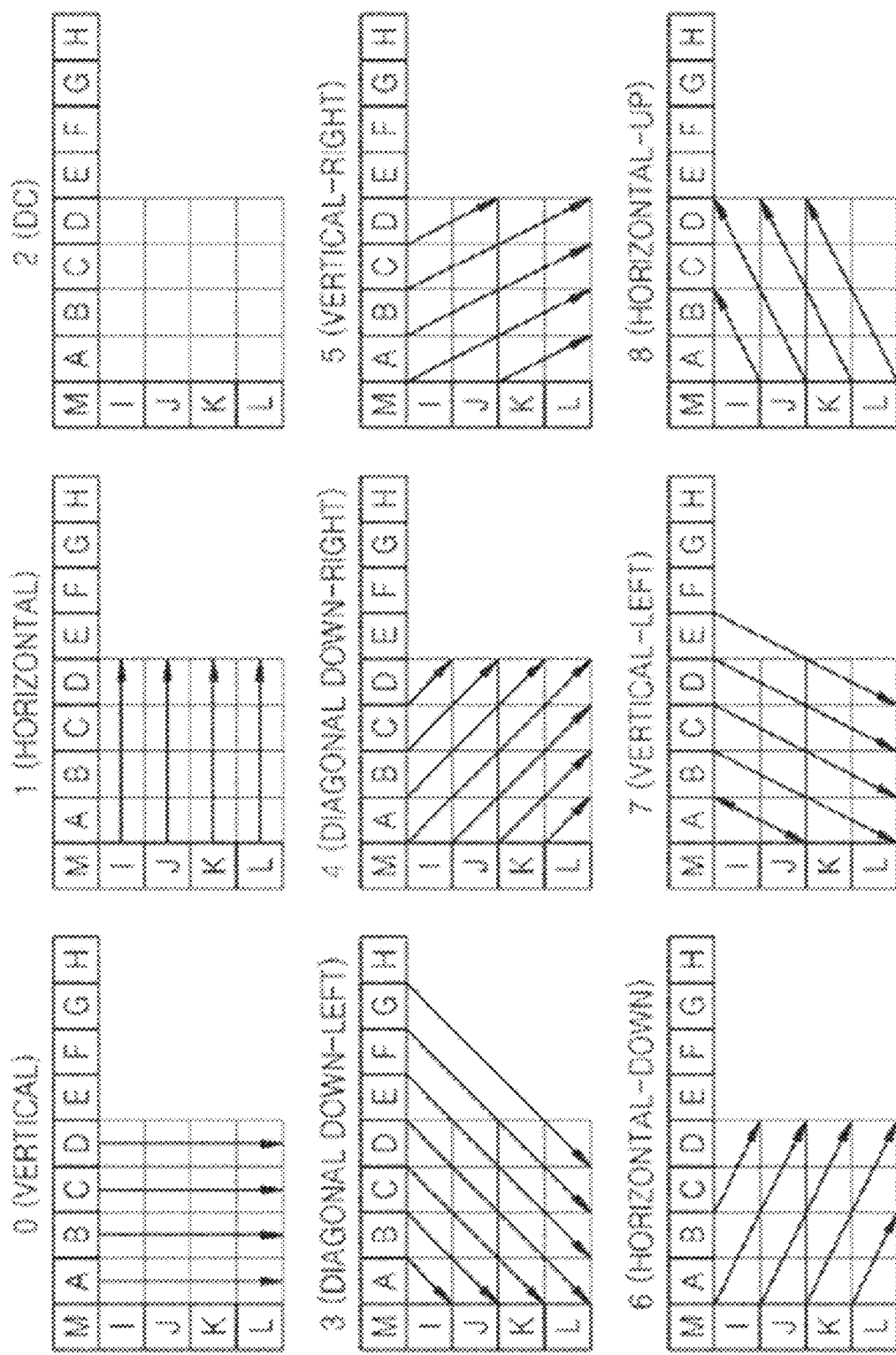
FIG. 13 shows some examples about directions of the intra prediction modes.

FIG. 10 illustrates a method of determining an adopted intra prediction mode on the basis of a most probable modes list, a selected modes list and a non-selected modes list. Method 900 can be performed by encoder 20 or decoder 30 of FIG. 1A. As already described above, the adopted intra prediction mode is one of a plurality of intra prediction modes comprising a plurality of angular or directional intra prediction modes (FIGS. 12-13) for intra predicting sample values of the current picture block 103.

Referring to FIG. 10, at S901, encoded data of a picture block is received. At S902, the encoded data is decoded to obtain an indication indicating whether or not an intra-prediction mode of the picture block is in the set of MPM. At S903, the encoded data is decoded to obtain the intra-prediction mode for the picture block according to the set of MPM.

FIG. 11 shows a table illustrating different intra prediction mode signaling schemes implemented in an apparatus, e.g., coding device 400 and/or apparatus 500, according to an embodiment. As can be taken from the table shown in FIG. 11, modes of the most probable modes (MPM) list are encoded using an MPM flag (1) and a truncated unary binarization. The intra prediction modes of the selected modes list are encoded using the MPM flag (0), a selected flag (1) and a fixed length code (4 bits in the case of 16 modes). The intra-prediction modes of the non-selected modes list are encoded using the MPM flag (0), the selected flag (0) and a truncated binary code (5 or 6 bits in the case of 45 modes).

In an embodiment, intra prediction unit 254 of the encoding apparatus 20 or Intra Prediction unit 354 of the decoding apparatus 30 is configured to construct the most probable modes (MPM) list, in a way described as below.

In an embodiment, the current picture block 103 can be part of a coding tree unit (CTU). In such a case an embodiment of the apparatus 100 is advantageous, where the processing unit 101 is configured to include intra prediction modes adopted for the second tier neighbors 109 of the current picture block 103, in the selected modes list only for those second tier neighbors 109 that belong to the same coding tree unit the current picture block 103 belongs to.

In an embodiment, each intra prediction mode can be identified by a unique intra prediction mode index. In an embodiment, intra prediction unit 254 of the encoding apparatus 20 or intra prediction unit 354 of the decoding apparatus 30 can be further configured to complete a default modes list by including one or more angular or directional intra prediction modes in the default modes list.

In an embodiment, the processing unit 101 is further configured to complete the selected modes list (provided a given mode is not already included in the list and the list is not complete, i.e. full yet) by including one or more angular intra prediction modes in the selected modes list, whose respective intra prediction mode index has an offset of +1, −1, +2, −2, +3 or −3 with respect to an intra prediction mode index of an angular intra prediction mode already included in the selected modes list.

Embodiments of the disclosure relate to the field of computer vision, in particular to the topic normally referred to as video processing and video coding.

In JVET L (Macau) meeting, 6-MPM (Most Probable Modes) approach (THE FIRST MPM SOLUTION) is recommended in intra mode coding. The current code block's intra prediction is probably picked up from the 6 MPM list. This approach assures two non-angular modes (i.e. Planar and DC, corresponding to value 0 and 1, respectively) always exists after the MPM construction.

After intra mode is derived, the WC codec would use this mode and reference samples from neighboring blocks to perform intra prediction. Conventionally, there is only one line of reference samples are used for intra prediction. To improve coding efficiency, a method using multiple reference sample lines (THE SECOND MPM SOLUTION, version 1.1.4, in the following text, only THE SECOND MPM SOLUTION is used to simplify the naming) is proposed and has been decided to be adopted. In this approach, the reference sample line is picked up from one of the four nearest lines of the neighboring blocks, as shown in FIG. 9.

Following different features needs to be resolved between THE FIRST MPM SOLUTION and THE SECOND MPM SOLUTION.

1. THE FIRST MPM SOLUTION uses 6 MPM modes (the 6-MPM list) while THE SECOND MPM SOLUTION only considers 3 MPM modes (the 3-MPM list). Some more information are provided to clarify the difference:
   a. Both of them use in total 67 modes (Planar, DC, and 65 angular modes), as show in FIG. 6.
   b. In the case of THE FIRST MPM SOLUTION, if the intra mode of the current block is not in the MPM list, then the intra mode coding for one of the remaining 61 intra modes are coded using truncated binary code.
   c. In the case of THE SECOND MPM SOLUTION,
      i. when reference line index equals to 0, if the current block's intra mode is not in the MPM list, then the intra mode coding for the remaining 64 non-MPM modes are coded using fixed length coding.
      ii. When reference line index is not equal to 0, then the intra mode of the current block is assured to be in the 3-MPM list.
2. Second, THE FIRST MPM SOLUTION assures Planar and DC modes are always in the MPM list. However, in THE SECOND MPM SOLUTION planar and DC are excluded from the 3-MPM list when the reference sample line index is not equal to 0.

In an embodiment, a method of multi-reference line intra prediction (MRL) with 6-MPM modes (i.e. the 6-MPM list) is provided.

Following embodiments can be the candidates to harmonize the two approaches, shown as follows.

[1] use different 6 MPM list generation based on reference line index.
   a. When reference line index is equal to 0, 6 MPM list generation in THE FIRST MPM SOLUTION that always includes planar and DC modes is used. A value of MPM_Flag can be either 0 or 1, wherein the MPM_Flag indicates whether the intra mode of the current block is derived from the MPM list or not. If the value of the MPM_Flag is 1, it indicates the intra mode of the current block is derived from the MPM list; otherwise, it indicates the intra mode of the current block is not derived from the MPM list.
      i. If a value of MPM_FLAG is 1, the mpm_idx is signalled as truncated unary code.
      ii. Otherwise, non-MPM mode signalling uses truncated binary code, e.g. the intra mode for one of the remaining 61 intra modes are coded using truncated binary code.
   b. When the reference line index is not equal to 0, 3-MPM list used in THE SECOND MPM SOLUTION is extended to 6 MPM list and planar and DC are still excluded from 6 MPM list construction;
      i. A value of MPM_FLAG is always 1, indicating the intra mode used for the current block can be derived from the 6-MPM list, and no non-MPM mode is signalled.

[2] use the same 6 MPM list generation where Planar and DC are assured to be included after 6 MPM list construction, as done in THE FIRST MPM SOLUTION.
   a. When reference line index is 0, 6 MPM list generation in THE FIRST MPM SOLUTION is used. A value of MPM_Flag can be either 0 or 1.
      i. If MPM_FLAG is 1, the mpm_idx is signalled as truncated unary code.
      ii. Otherwise, non-MPM mode signalling uses truncated binary code.
   b. When reference line index is not 0, 6 MPM list in THE FIRST MPM SOLUTION that is always include planar and DC is used.
      i. A value of MPM_FLAG is always 1, indicating the intra mode used for the current block can be derived from the 6-MPM list, and no non-MPM mode is signalled.

[3] use the same 6 MPM list generation where Planar and DC are assured to be excluded after 6 MPM list construction.
   a. When reference line index is 0, an approach of 6 MPM list generation excluding Planar and DC is used. A value of MPM_Flag can be either 0 or 1.
      i. If a value of MPM_FLAG is 1, the mpm_idx is signalled as truncated unary code.
      ii. Otherwise, non-MPM mode signalling uses truncated binary code.
   b. When reference line index is not 0, the same 6 MPM list generation excluding Planar and DC is used.
      i. A value of MPM_FLAG is always 1, indicating the intra mode used for the current block can be derived from the 6-MPM list, and no non-MPM mode is signalled.

[4] Heterogeneous MPM approach, namely, two MPM lists with different sizes exists.
   a. if the reference line index is equal to 0, use 6 MPM list generation always considering planar and DC as done in THE FIRST MPM SOLUTION.
   b. Otherwise, the reference line index is greater than 0, use 3 MPM list construction excluding planar and DC as done in THE SECOND MPM SOLUTION.

[5] use different 6 MPM list generation based on reference line index.
   a. When reference line index is equal to 0, 6 MPM list generation in THE FIRST MPM SOLUTION that always includes planar and DC modes is used. A value of MPM_Flag can be either 0 or 1, wherein the MPM_Flag indicates whether the intra mode of the current block is derived from the MPM list or not. If the value of the MPM_Flag is 1, it indicates the intra mode of the current block is derived from the MPM list; otherwise, it indicates the intra mode of the current block is not derived from the MPM list.
      i. If a value of MPM_FLAG is 1, the mpm_idx is signalled as truncated unary code.
      ii. Otherwise, non-MPM mode signalling uses truncated binary code, e.g. the intra mode coding for one of the remaining 61 intra modes are coded using truncated binary code.
   b. When the reference line index is not equal to 0, 3-MPM list used in THE SECOND MPM SOLUTION is modified to 6 MPM list and planar and DC are still excluded from 6 MPM list construction;

i. A value of MPM_FLAG is always 1, indicating the intra mode used for the current block can be derived from the 6-MPM list, and no non-MPM mode is signalled.

Embodiment [1] uses the following steps:

a) Identify whether a current block is on the CTU boundary.
  i. If so (e.g. above block of the current block is located in another CTU), then a value of intra_luma_ref_idx is set equal to 0;
  ii. Otherwise, a value of intra_luma_ref_idx is decoded from the bitstream.
b) If a value of intra_luma_ref_idx is equal to 0, use the 6 MPM approach, which further comprises following steps:
  i. Derive a value of intra_luma_mpm_flag from the bitstream.
  ii. If a value of intra_luma_mpm_flag is true (e.g. the value of intra_luma_mpm_flag is equal to 1), then a 6 MPM is constructed.
  iii. Otherwise (i.e. intra_luma_mpm_flag is false, e.g. the value of intra_luma_mpm_flag is equal to 0), then a truncated binary coded intra mode is derived by the decoder.
  iv. The 6 MPM is constructed by inserting the following items as specified in THE FIRST MPM SOLUTION:
    The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX are derived as follows:
  The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
  The candidate intra prediction mode candIntraPredModeX is derived as follows:
    If one or more of the following conditions are true, candIntraPredModeX is set equal to INTRA_DC.
      The variable availableX is equal to FALSE.
      CuPredMode[xNbX][yNbX] is not equal to MODE_INTRA.
      X is equal to B and yCb−1 is less than ((yCb>>Ctb Log 2SizeY)<<Ctb Log 2SizeY).
    Otherwise, candIntraPredModeX is set equal to IntraPredModeY[xNbX][yNbX].
    The candModeList[x] with x=0 . . . 5 is derived as follows:

candModeList[0]=candIntraPredModeA (8-1)

candModeList[1]=!candIntraPredModeA (8-2)

candModeList[2]=INTRA_ANGULAR50 (8-3)

candModeList[3]=INTRA_ANGULAR18 (8-4)

candModeList[4]=INTRA_ANGULAR46 (8-5)

candModeList[5]=INTRA_ANGULAR54 (8-6)

If candIntraPredModeB is equal to candIntraPredModeA, the following applies:
  If candIntraPredModeA is larger than 1, candModeList[x] with x=0 . . . 5 is derived as follows:

candModeList[0]=candIntraPredModeA (8-7)

candModeList[1]=INTRA_PLANAR (8-8)

candModeList[2]=INTRA_DC (8-9)

candModeList[3]=2+((candIntraPredModeA+62)% 65) (8-10)

candModeList[4]=2+((candIntraPredModeA−1)% 65) (8-11)

candModeList[5]=2+((candIntraPredModeA+61)% 65) (8-12)

Otherwise (candIntraPredModeB is not equal to candIntraPredModeA), the following applies:
candModeList[0] and candModeList[1] are derived as follows:

candModeList[0]=candIntraPredModeA (8-13)

candModeList[1]=candIntraPredModeB (8-14)

Set the variable biggerIdx is as follows biggerIdx=candModeList[0]>candModeList[1]?0:1 (8-15)

If both of candIntraPredModeA and candIntraPredModeB are larger than 1, candModeList[x] with x=2 . . . 5 is derived as follows:

candModeList[2]=INTRA_PLANAR (8-16)

candModeList[3]=INTRA_DC (8-17)

If candModeList[biggerIdx]−candModeList[!biggerIdx] is equal to neither 64 nor 1, the following applies:

candModeList[4]=2+((candModeList[biggerIdx]+62)% 65) (8-18)

candModeList[5]=2+((candModeList[biggerIdx]−1)% 65) (8-19)

Otherwise, the following applies:

candModeList[4]=2+((candModeList[biggerIdx]+61)% 65) (8-20)

candModeList[5]=2+(candModeList[biggerIdx]% 65) (8-21)

Otherwise, if sum of candIntraPredModeA and candIntraPredModeB is larger or equal to 2, the following applies:

candModeList[2]=!candModeList[!biggerIdx] (8-22)

candModeList[3]=2+((candModeList[biggerIdx]+62)% 65) (8-23)

candModeList[4]=2+((candModeList[biggerIdx]−1)% 65) (8-24)

candModeList[5]=2+((candModeList[biggerIdx]+61)% 65) (8-25)

3. Otherwise (a value of intra_luma_ref_idx is not equal to 0), a value of intra_luma_mpm_flag is set to 1. A 6 MPM list is constructed as follows:
The neighbouring locations (xNbA, yNbA) and (xNbB, yNbB) are set equal to (xCb−1, yCb+cbHeight−1) and (xCb+cbWidth−1, yCb−1), respectively. For X being replaced by either A or B, the variables candIntraPred-ModeX are derived as follows:

The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set equal to INTRA_DC.
The variable availableX is equal to FALSE.
CuPredMode[xNbX][yNbX] is not equal to MODE_INTRA.
X is equal to B and yCb−1 is less than ((yCb>>Ctb Log 2SizeY)<<CtbLog2SizeY).
Otherwise, candIntraPredModeX is set equal to IntraPredModeY[xNbX][yNbX].

a. candIntraPredModeB is less than or equal to INTRA_DC and candIntraPredModeA is less than or equal to INTRA_DC, candModeList[x] with x=0 . . . 5 is derived as follows:

candModeList[0]=INTRA_ANGULAR2 (2-1)

candModeList[1]=INTRA_ANGULAR18 (2-2)

candModeList[2]=INTRA_ANGULAR50 (2-3)

candModeList[3]=INTRA_ANGULAR46 candModeList[4]=INTRA_ANGULAR54 candModeList[5]=INTRA_ANGULAR66 b. Otherwise, if candIntraPredModeB is less than or equal to INTRA_DC, candModeList[x] with x=0 . . . 5 is derived as follows:

candModeList[0]=candIntraPredModeA (2-4)

candModeList[1]=2+((candIntraPredModeA+61)% 64) (2-5)

candModeList[2]=2+((candIntraPredModeA−1)% 64) (2-6)

candModeList[3]=INTRA_ANGULAR46 candModeList[4]=INTRA_ANGULAR54 candModeList[5]=INTRA_ANGULAR66 c. Otherwise, if candIntraPredModeA is less than or equal to INTRA_DC, candModeList[x] with x=0 . . . 2 is derived as follows:

candModeList[0]=candIntraPredModeB (2-7)

candModeList[1]=2+((candIntraPredModeB+61)% 64) (2-8)

candModeList[2]=2+((candIntraPredModeB−1)% 64) (2-9)

candModeList[3]=INTRA_ANGULAR46 candModeList[4]=INTRA_ANGULAR54 candModeList[5]=INTRA_ANGULAR66 d. Otherwise, and ModeList[x] with x=0 . . . 2 is derived as follows:

e. candModeList[0] and candModeList[1] are derived as follows:

candModeList[0]=candIntraPredModeA (2-10)

candModeList[1]=candIntraPredModeB (2-11)

f. If candModeList[0] is equal to INTRA_ANGULAR18, candModeList[2] is derived as follows:

candModeList[2]=candModeList[1]==INTRA_ANGULAR50? (2-12)

INTRA_ANGULAR2: INTRA_ANGULAR50 g. Otherwise, if candModeList[0] is equal to INTRA_ANGULAR50, candModeList[2] is derived as follows:

candModeList[2]=candModeList[1]==INTRA_ANGULAR18? (2-13)

INTRA_ANGULAR2: INTRA_ANGULAR18 h. Otherwise, candModeList[2] is derived as follows:

candModeList[2]=candModeList[1]==INTRA_ANGULAR50? (2-14)

INTRA_ANGULAR18: INTRA_ANGULAR50 candModeList[3]=INTRA_ANGULAR46 candModeList[4]=INTRA_ANGULAR54 candModeList[5]=INTRA_ANGULAR66

4. If a value of intra_luma_mpm_flag is 1, decode mpm_idx from the bitstream. The intra mode is derived from candModeList[mpm_idx].
5. Otherwise, an intra mode has been derived from non-MPM truncated binary decoding.
6. An intra prediction process use the derived intra mode and the corresponding reference sample line is performed.

In other words, a parsing process with following control parameters are defined. These control flow parameters are:

Reference line index, indicating the location of reference sample line as shown in FIG. 9, corresponding to variable intra_luma_ref_idx. This index might need to be further mapped from a table to derived the real reference line index.

The mpm flag, indicating whether the intra mode of the current block can be derived from a MPM list, corresponds to a beforehand variable intra_luma_mpm_flag. The same construction rule of MPM list shall be applied between encoder and decoder. When intra_luma_mpm_flag equals to 1, current block's intra mode can be derived from the MPM list; otherwise, the current block's intra mode are directly derived from truncated binary code, rather than from an index of MPM list.

The process requires following steps to perform the intra prediction:

1. Determine the value of reference line index. If a current block and an above block of the current block locates on different CTUs, then a value of the reference line index will not be signaled, and the value of the reference line is inferred as 0. Otherwise, a value associated with reference line index is signaled. The signaled value ranges for the reference line index is from 0 to 2, and the reference line index is derived according to the following table. In other words, reference line index would not equal to 2, and the corresponding third nearest reference line would not be used.

| Signaled value | Reference line index |
|---|---|
| 0 | 0 |
| 1 | 1 |
| 2 | 3 |

2. If a value of reference line index is 0, a value of MPM_flag is signaled in the bitstream and this value can be either 0 or 1. Furthermore, a 6 MPM list which always include Planar and DC modes are constructed as follows:

Set a variable candIntraPredModeA to INTRA_PLANAR mode, a variable candIntraPredModeB to INTRA_PLANAR mode.

Check the availability of left and above blocks.

The left block is considered as not available when the left block is out of the frame boundary, or encoded mode of the left block is not intra mode; otherwise, the left block's intra mode is derived by variable candIntraPredModeA.

The above block is considered as not available when the above block is out of the frame boundary, or encoded mode of the above block is not intra mode, or position of the above block is not located in the same CTU as the current block; otherwise, the above block's intra mode is derived by variable candIntraPredModeB.

According to the values of candIntraPredModeA and candIntraPredModeB, there would be three cases:

Case 0: neither of candIntraPredModeA and candIntraPredModeB are angular modes (>1). In this case, the 6 MPM list is constructed as follows:

candModeList[0]=candIntraPredModeA candModeList[1]=!candIntraPredModeA candModeList[2]=INTRA_ANGULAR50 candModeList[3]=INTRA_ANGULAR18 candModeList[4]=INTRA_ANGULAR46 candModeList[5]=INTRA_ANGULAR54

Case 1: only one angular mode is found in candIntraPredModeA and candIntraPredModeB. Suppose the angular mode is Ang (either equals candIntraPredModeA, or candIntraPredModeB, or both candIntraPredModeA and candIntraPredModeB and candIntraPredModeA has the same mode to candIntraPredModeB. In this case, the 6 MPM list is constructed as follows:

candModeList[0]=Ang candModeList[1]=INTRA_PLANAR candModeList[2]=INTRA_DC candModeList[3]=2+((Ang+62)% 65)

candModeList[4]=2+((Ang−1)% 65)

candModeList[5]=2+((Ang+61)% 65)

it is worth noting that the form 2+((Ang+62)% 65) is to find Ang's closest neighboring mode in minus direction, Ang−1. This form, however, make sure its neighboring mode is also an angular mode.

Case 2: candIntraPredModeA and candIntraPredModeB are two difference angular modes. In this case, the first four entries of the MPM list is filled as follows:

candModeList[0]=candIntraPredModeA candModeList[1]=candIntraPredModeB candModeList[2]=INTRA_PLANAR candModeList[3]=INTRA_DC The last two entries are filled using neighboring modes of the bigger mode between candIntraPredModeA and candIntraPredModeB. It is further depends on whether candIntraPredModeA and candIntraPredModeB are two neighboring angular modes. Suppose if the bigger mode between candIntraPredModeA and candIntraPredModeB has the index biggerIdx (must be 0 or 1).

If candIntraPredModeA and candIntraPredModeB are not neighboring modes, then use the bigger modes' closest neighboring modes (−1, +1) to fill the remaining entries:

candModeList[4]=2+((candModeList[biggerIdx]+62)% 65)

candModeList[5]=2+((candModeList[biggerIdx]−1)% 65)

otherwise, candIntraPredModeA and candIntraPredModeB are neighboring modes. Use the second closest neighboring modes to filled the remaining entries:

candModeList[4]=2+((candModeList[biggerIdx]+61)% 65)

candModeList[5]=2+(candModeList[biggerIdx]−1)% 65)

3. Otherwise (i.e. a value of reference line index not equals to 0), the MPM_flag is not signaled and its value is inferred as 0. Furthermore, a 6 MPM list which always not include Planar and DC mode is generated as follows:

Set a variable candIntraPredModeA to INTRA_DC mode, a variable candIntraPredModeB to INTRA_DC mode.

Check the availability of left and above blocks.

The left block is considered as not available when it is out of the frame boundary, or its encoded mode is not intra mode; otherwise, the left block's intra mode is derived by variable candIntraPredModeA.

The above block is considered as not available when it is out of the frame boundary, or its encoded mode is not intra mode, or its position is not located in the same CTU as the current block; otherwise, the above block's intra mode is derived by variable candIntraPredModeB.

According to the values of candIntraPredModeA and candIntraPredModeB, there would be three cases:
Case 0: neither of candIntraPredModeA and candIntraPredModeB are angular modes (>1). In this case, the 6 MPM list is constructed as follows:

candModeList[0]=INTRA_ANGULAR2 candModeList[1]=INTRA_ANGULAR18 candModeList[2]=INTRA_ANGULAR50 candModeList[3]=INTRA_ANGULAR46 candModeList[4]=INTRA_ANGULAR54 candModeList[5]=INTRA_ANGULAR66

Case 1: only one angular mode is found in candIntraPredModeA and candIntraPredModeB. Suppose the angular mode is Ang (either equals candIntraPredModeA, or candIntraPredModeB, or both candIntraPredModeA and candIntraPredModeB and candIntraPredModeA has the same mode to candIntraPredModeB. In this case, the first 3 MPM list is constructed as follows:

candModeList[0]=Ang candModeList[1]=2+((Ang+61)% 64)

candModeList[2]=2+((Ang−1)% 64)

It is worth noting that the form 2+((Ang+61)% 64) is to find candIntraPredModeA's closest neighboring mode in minus direction, Ang−1.This form, however, make sure its neighboring mode is also an angular mode.

The last three entries are inserted by pick up modes from a default list (INTRA_ANGULAR2, INTRA_ANGULAR18, INTRA_ANGULAR50, INTRA_ANGULAR46, INTRA_ANGULAR54, INTRA_ANGULAR66, INTRA_ANGULAR34, INTRA_ANGULAR14, INTRA_ANGULAR22), assuming candIntraPredModeA and its two neighboring modes do not equal to any of the mode in the default list, one example of the 6 MPM construction is shown as follows:

candModeList[3]=INTRA_ANGULAR2 candModeList[4]=INTRA_ANGULAR18 candModeList[5]=INTRA_ANGULAR50

Case 2: candIntraPredModeA and candIntraPredModeB are two difference angular modes. In this case, the first two entries of the MPM list is filled as follows:

candModeList[0]=candIntraPredModeA candModeList[1]=candIntraPredModeB

The last four entries are inserted by pick up modes from a default list (INTRA_ANGULAR2, INTRA_ANGULAR18, INTRA_ANGULAR50, INTRA_ANGULAR46, INTRA_ANGULAR54, INTRA_ANGULAR66, INTRA_ANGULAR34, INTRA_ANGULAR14, INTRA_ANGULAR22), assuming candIntraPredModeA and candIntraPredModeB do not equal to any of the mode in the default list, one example of the 6 MPM construction is shown as follows:

candModeList[2]=INTRA_ANGULAR2 candModeList[3]=INTRA_ANGULAR18 candModeList[4]=INTRA_ANGULAR50 candModeList[5]=INTRA_ANGULAR34

4. If mpm_flag is 1, decode mpm_idx from the bitstream, the intra mode is derived from candModeList [mpm_idx].
5. Otherwise, an intra mode has been derived from non-MPM truncated binary decoding.
6. An intra prediction process use the derived intra mode and the corresponding reference sample line is performed.

Finally, it is worth noting that the default mode used to extend additional mode list are pick up from a default mode list (2, 18, 50, 46, 54, 66, 34, 14, 22). The above mentioned workflow is just one example picking up modes from a specified order.

It is also worth noting that for a mode to be inserted, a pruning check is performed. If a same mode has been already in the candModeList, then the candidate mode in the default mode list is skipped. The insertion process is continued until the 6 entries are all filled in the candModeList. It is worth noting that for deriving angular mode's neighboring modes, two forms are used with different modular operations, i.e.:

Form 1: (Ang−1)→2+((Angular+61)% 64); (Ang+1)→2+((Angular−1)% 64)

Form 2: (Ang−1)→2+((Angular+62)% 65); (Ang+1)→2+((Angular−1)% 65)

Either of them can be used for 6-MPM list construction, The above mentioned workflow is just one example picking up Form 2 for the case when reference line index equals to 0, and Form 1 for the case when reference line index is not equal to 0.

It is worth noting that two versions of a same workflow are given in Embodiment 1, one specification text and the other a corresponding explanation. For the simplicity of text, the other embodiments only provide description in specification text. The explanation can be inferred correspondingly from embodiment 1.

Embodiment [2] of the disclosure using the following steps:
1. Identify whether the current block is on the CTU boundary.
  i. If so (its above block locate in another CTU), then intra_luma_ref_idx is equal to 0
  ii. Otherwise, intra_luma_ref_idx is decoded from the bitstream.
2. If intra_luma_ref_idx is equal to 0, use the 6 MPM approach, which further consisting of following steps:
  iii. Derive intra_luma_mpm_flag from the bitstream.
  iv. If intra_luma_mpm_flag is equal to true, then a 6 MPM is constructed.
  v. Otherwise (i.e. intra_luma_mpm_flag is equal to false), then a truncated binary coded intra mode is derived by the decoder.
  vi. The 6 MPM is constructed by inserting the following items as specified in THE FIRST MPM SOLUTION:
    The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX are derived as follows:
  The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
  The candidate intra prediction mode candIntraPredModeX is derived as follows:
    If one or more of the following conditions are true, candIntraPredModeX is set equal to INTRA_DC.
      The variable availableX is equal to FALSE.
      CuPredMode[xNbX][yNbX] is not equal to MODE_INTRA.
      X is equal to B and yCb−1 is less than ((yCb>>CtbLog2SizeY)<<CtbLog2SizeY).
    Otherwise, candIntraPredModeX is set equal to IntraPredModeY[xNbX][yNbX].
The candModeList[x] with x=0 . . . 5 is derived as follows:

candModeList[0]=candIntraPredModeA  (8-1)

candModeList[1]=!candIntraPredModeA  (8-2)

candModeList[2]=INTRA_ANGULAR50  (8-3)

candModeList[3]=INTRA_ANGULAR18  (8-4)

candModeList[4]=INTRA_ANGULAR46  (8-5)

candModeList[5]=INTRA_ANGULAR54  (8-6)

If candIntraPredModeB is equal to candIntraPredModeA, the following applies:
    If candIntraPredModeA is larger than 1, candModeList[x] with x=0 . . . 5 is derived as follows:

candModeList[0]=candIntraPredModeA  (8-7)

candModeList[1]=INTRA_PLANAR  (8-8)

candModeList[2]=INTRA_DC  (8-9)

candModeList[3]=2+((candIntraPredModeA+62)% 65)  (8-10)

candModeList[4]=2+((candIntraPredModeA−1)% 65)  (8-11)

candModeList[5]=2+((candIntraPredModeA+61)% 65)  (8-12)

Otherwise (candIntraPredModeB is not equal to candIntraPredModeA), the following applies:
    candModeList[0] and candModeList[1] are derived as follows:

candModeList[0]=candIntraPredModeA (8-13)

candModeList[1]=candIntraPredModeB (8-14)

Set the variable biggerIdx is as follows biggerIdx=candModeList[0]>candModeList[1]?0:1  (8-15)

If both of candIntraPredModeA and candIntraPredModeB are larger than 1, candModeList[x] with x=2 . . . 5 is derived as follows:

candModeList[2]=INTRA_PLANAR  (8-16)

candModeList[3]=INTRA_DC  (8-17)

If candModeList[biggerIdx]−candModeList[biggerIdx] is equal to neither 64 nor 1, the following applies:

candModeList[4]=2+((candModeList[biggerIdx]+62)% 65)  (8-18)

candModeList[5]=2+((candModeList[biggerIdx]−1)% 65)  (8-19)

Otherwise, the following applies:

candModeList[4]=2+((candModeList[biggerIdx]+61)% 65)  (8-20)

candModeList[5]=2+(candModeList[biggerIdx]% 65)  (8-21)

Otherwise, if sum of candIntraPredModeA and candIntraPredModeB is larger or equal to 2, the following applies:

candModeList[2]=!candModeList[!biggerIdx]  (8-22)

candModeList[3]=2+((candModeList[biggerIdx]+62)% 65)  (8-23)

candModeList[4]=2+((candModeList[biggerIdx]−1)% 65)  (8-24)

candModeList[5]=2+((candModeList[biggerIdx]+61)% 65)  (8-25)

3. Otherwise (intra_luma_ref_idx is not equal to 0), intra_luma_mpm_flag is set to 1. And the same 6 MPM list generation approach used in step 2 is performed.
  4. If infra_luma_mpm_flag is 1, decode mpm_idx from the bitstream, the intra mode is derived from candModeList[mpm_idx].
  5. Otherwise, an intra mode has been derived from non-MPM truncated binary decoding.
  6. An intra prediction process use the derived intra mode and the corresponding reference sample line is performed.

It is worth noting that the three extra modes used to extend additional mode list are pick up from a default mode list (46, 54, 66, 34, 14, 22). The above mentioned workflow is just one example picking up (46, 54, 66) in the specified order. It is also worth noting that for a mode to be inserted, a pruning check is performed. If a same mode has been already in the candModeList, then the candidate mode in the default mode list is skipped. The insertion process is continued until the 6 entries are all filled in the candModeList.

It is worth noting that for deriving angular mode's neighboring modes, two forms are used with different modular operations, i.e.:

Form 1: (Ang−1)→2+((Angular+61)% 64);
    (Ang+1)→2+((Angular−1)% 64)

Form 2: (Ang−1)→2+((Angular+62)% 65);
    (Ang+1)→2+((Angular−1)% 65)

Either of them can be used for 6-MPM list construction, the above mentioned workflow is just one example picking up Form 2 for the case when reference line index equals to 0, and Form 1 for the case when reference line index is not equal to 0.

Embodiment [3] of the disclosure uses the following steps:
  1. Identify whether the current block is on the CTU boundary.
    i. If so (its above block locate in another CTU), then intra_luma_ref_idx is equal to 0 ii. Otherwise, intra_luma_ref_idx is decoded from the bitstream.
2. If intra_luma_ref_idx is equal to 0, use the 6 MPM approach, which further consisting of following steps:
    iii. Derive intra_luma_mpm_flag from the bitstream.
    iv. If intra_luma_mpm_flag is equal to true, then a 6 MPM is constructed.
    v. Otherwise (i.e. intra_luma_mpm_flag is equal to false), then a truncated binary coded intra mode is derived by the decoder.
    vi. A 6 MPM list that exclude planar and DC modes are constructed as follows:

The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX are derived as follows:

The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set equal to INTRA_DC.
The variable availableX is equal to FALSE.
CuPredMode[xNbX][yNbX] is not equal to MODE_INTRA.
X is equal to B and yCb−1 is less than ((yCb>>CtbLog2SizeY)<<CtbLog2SizeY).
Otherwise, candIntraPredModeX is set equal to IntraPredModeY[xNbX][yNbX].

a. candIntraPredModeB is less than or equal to INTRA_DC and candIntraPredModeA is less than or equal to INTRA_DC, candModeList[x] with x=0 . . . 5 is derived as follows:

candModeList[0]=INTRA_ANGULAR2 (2-15)

candModeList[1]=INTRA_ANGULAR18 (2-16)

candModeList[2]=INTRA_ANGULAR50 (2-17)

candModeList[3]=INTRA_ANGULAR46 candModeList[4]=INTRA_ANGULAR54 candModeList[5]=INTRA_ANGULAR66 b. Otherwise, if candIntraPredModeB is less than or equal to INTRA_DC, candModeList[x] with x=0 . . . 5 is derived as follows:

candModeList[0]=candIntraPredModeA (2-18)

candModeList[1]=2+((candIntraPredModeA+61)% 64) (2-19)

candModeList[2]=2+((candIntraPredModeA−1)% 64) (2-20)

candModeList[3]=INTRA_ANGULAR46 candModeList[4]=INTRA_ANGULAR54 candModeList[5]=INTRA_ANGULAR66 c. Otherwise, if candIntraPredModeA is less than or equal to INTRA_DC, candModeList[x] with x=0 . . . 2 is derived as follows:

candModeList[0]=candIntraPredModeB (2-21)

candModeList[1]=2+((candIntraPredModeB+61)% 64) (2-22)

candModeList[2]=2+((candIntraPredModeB−1)% 64) (2-23)

candModeList[3]=INTRA_ANGULAR46 candModeList[4]=INTRA_ANGULAR54 d. candModeList[5]=INTRA_ANGULAR66 Otherwise, and ModeList[x] with x=0 . . . 2 is derived as follows:

e. candModeList[0] and candModeList[1] are derived as follows:

candModeList[0]=candIntraPredModeA (2-24)

candModeList[1]=candIntraPredModeB (2-25)

f. If candModeList[0] is equal to INTRA_ANGULAR18, candModeList[2] is derived as follows:

candModeList[2]=candModeList[1]
==INTRA_ANGULAR50?INTRA_ANGULAR2:
INTRA_ANGULAR50 (2-26)

g. Otherwise, if candModeList[0] is equal to INTRA_ANGULAR50, candModeList[2] is derived as follows:

candModeList[2]=candModeList[1]
==INTRA_ANGULAR18?INTRA_ANGULAR2:
INTRA_ANGULAR18 (2-27)

h. Otherwise, candModeList[2] is derived as follows:

candModeList[2]=candModeList[1]
==INTRA_ANGULAR50?INTRA_ANGULAR18:
INTRA_ANGULAR50 (2-28)

candModeList[3]=INTRA_ANGULAR46 candModeList[4]=INTRA_ANGULAR54 candModeList[5]=INTRA_ANGULAR66

3. Otherwise (intra_luma_ref_idx is not equal to 0), intra_luma_mpm_flag is set to 1. And the same 6 MPM list generation approach used in step 2 is performed.
4. If intra_luma_mpm_flag is 1, decode mpm_idx from the bitstream, the intra mode is derived from candModeList[mpm_idx].
5. Otherwise, an intra mode has been derived from non-MPM truncated binary decoding.
6. An intra prediction process use the derived intra mode and the corresponding reference sample line is performed.

It is worth noting that the three extra modes used to extend additional mode list are pick up from a default mode list (46, 54, 66, 34, 14, 22). The above mentioned workflow is just one example picking up (46, 54, 66) in the specified order. It is also worth noting that for a mode to be inserted, a pruning check is performed. If a same mode has been already in the candModeList, then the candidate mode in the default mode list is skipped. The insertion process is continued until the 6 entries are all filled in the candModeList.

It is worth noting that for deriving angular mode's neighboring modes, two forms are used with different modular operations, i.e.:

Form 1: (Ang−1)→2+((Angular+61)% 64); (Ang+1)→2+((Angular−1)% 64)

Form 2: (Ang−1)→2+((Angular+62)% 65); (Ang+1)→2+((Angular−1)% 65)

Either of them can be used for 6-MPM list construction, The above mentioned workflow is just one example picking up Form 2 for the case when reference line index equals to 0, and Form 1 for the case when reference line index is not equal to 0.

Embodiment [4] of the disclosure uses the following steps:
1. Identify whether the current block is on the CTU boundary.
   i. If so (above block of the current block is located in another CTU), then a value of intra_luma_ref_idx is set equal to 0;
   ii. Otherwise, a value of intra_luma_ref_idx is decoded from the bitstream.
2. If a value of intra_luma_ref_idx is equal to 0, use the 6 MPM approach, which further comprises following steps:
   iii. Derive a value of intra_luma_mpm_flag from the bitstream.
   iv. If intra_luma_mpm_flag is true (e.g. a value of intra_luma_mpm_flag is 1), then a 6 MPM is constructed.
   v. Otherwise (i.e. intra_luma_mpm_flag is false, e.g. a value of intra_luma_mpm_flag is 0), then a fixed length coded intra mode is derived by the decoder.
   vi. The 6 MPM is constructed by inserting the following items as specified in THE FIRST MPM SOLUTION:
      The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX are derived as follows:
   The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
   The candidate intra prediction mode candIntraPredModeX is derived as follows:
      If one or more of the following conditions are true, candIntraPredModeX is set equal to INTRA_DC.
         The variable availableX is equal to FALSE.
         CuPredMode[xNbX][yNbX] is not equal to MODE_INTRA.
         X is equal to B and yCb−1 is less than ((yCb>>CtbLog2SizeY)<<CtbLog2SizeY).
      Otherwise, candIntraPredModeX is set equal to IntraPredModeY[xNbX][yNbX].
      The candModeList[x] with x=0 . . . 5 is derived as follows:

candModeList[0]=candIntraPredModeA (8-1)

candModeList[1]=!candIntraPredModeA (8-2)

candModeList[2]=INTRA_ANGULAR50 (8-3)

candModeList[3]=INTRA_ANGULAR18 (8-4)

candModeList[4]=INTRA_ANGULAR46 (8-5)

candModeList[5]=INTRA_ANGULAR54 (8-6)

If candIntraPredModeB is equal to candIntraPredModeA, the following applies:
   If candIntraPredModeA is larger than 1, candModeList[x] with x=0 . . . 5 is derived as follows:

candModeList[0]=candIntraPredModeA (8-7)

candModeList[1]=INTRA_PLANAR (8-8)

candModeList[2]=INTRA_DC (8-9)

candModeList[3]=2+((candIntraPredModeA+62)% 65) (8-10)

candModeList[4]=2+((candIntraPredModeA−1)% 65) (8-11)

candModeList[5]=2+((candIntraPredModeA+61)% 65) (8-12)

Otherwise (candIntraPredModeB is not equal to candIntraPredModeA), the following applies:
   candModeList[0] and candModeList[1] are derived as follows:

candModeList[0]=candIntraPredModeA (8-13)

candModeList[1]=candIntraPredModeB (8-14)

Set the variable biggerIdx is as follows biggerIdx=candModeList[0]>candModeList[1]?0:1 (8-15)

If both of candIntraPredModeA and candIntraPredModeB are larger than 1, candModeList[x] with x=2.5 is derived as follows:

candModeList[2]=INTRA_PLANAR (8-16)

candModeList[3]=INTRA_DC (8-17)

If candModeList[biggerIdx]−candModeList[!biggerIdx] is equal to neither 64 nor 1, the following applies:

candModeList[4]=2+((candModeList[biggerIdx]+62)% 65) (8-18)

candModeList[5]=2+((candModeList[biggerIdx]−1)% 65) (8-19)

Otherwise, the following applies:

candModeList[4]=2+((candModeList[biggerIdx]+61)% 65) (8-20)

candModeList[5]=2+(candModeList[biggerIdx]% 65) (8-21)

Otherwise, if sum of candIntraPredModeA and candIntraPredModeB is larger or equal to 2, the following applies:

candModeList[2]=!candModeList[!biggerIdx] (8-22)

candModeList[3]=2+((candModeList[biggerIdx]+62)% 65) (8-23)

candModeList[4]=2+((candModeList[biggerIdx]−1)% 65) (8-24)

candModeList[5]=2+((candModeList[biggerIdx]+61)% 65) (8-25)

3. Otherwise (a value of intra_luma_ref_idx is not equal to 0), a value of intra_luma_mpm_flag is set to 1. A 3 MPM list is constructed as follows:

The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX are derived as follows:

The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set equal to INTRA_DC.
The variable availableX is equal to FALSE.
CuPredMode[xNbX][yNbX] is not equal to MODE_INTRA.
X is equal to B and yCb−1 is less than ((yCb>>CtbLog2SizeY)<<CtbLog2SizeY).

Otherwise, candIntraPredModeX is set equal to IntraPredModeY[xNbX][yNbX].

a. candIntraPredModeB is less than or equal to INTRA_DC and candIntraPredModeA is less than or equal to INTRA_DC, candModeList[x] with x=0 . . . 25 is derived as follows:

$$\text{candModeList}[0]=\text{INTRA\_ANGULAR2} \quad (2\text{-}29)$$

$$\text{candModeList}[1]=\text{INTRA\_ANGULAR18} \quad (2\text{-}30)$$

$$\text{candModeList}[2]=\text{INTRA\_ANGULAR50} \quad (2\text{-}31)$$

b. Otherwise, if candIntraPredModeB is less than or equal to INTRA_DC, candModeList[x] with x=0 . . . 25 is derived as follows:

$$\text{candModeList}[0]=\text{candIntraPredModeA} \quad (2\text{-}32)$$

$$\text{candModeList}[1]=2+((\text{candIntraPredModeA}+61)\%\ 64) \quad (2\text{-}33)$$

$$\text{candModeList}[2]=2+((\text{candIntraPredModeA}-1)\%\ 64) \quad (2\text{-}34)$$

c. Otherwise, if candIntraPredModeA is less than or equal to INTRA_DC, candModeList[x] with x=0 . . . 2 is derived as follows:

$$\text{candModeList}[0]=\text{candIntraPredModeB} \quad (2\text{-}35)$$

$$\text{candModeList}[1]=2+((\text{candIntraPredModeB}+61)\%\ 64) \quad (2\text{-}36)$$

$$\text{candModeList}[2]=2+((\text{candIntraPredModeB}-1)\%\ 64) \quad (2\text{-}37)$$

d. Otherwise, andModeList[x] with x=0 . . . 2 is derived as follows:
e. candModeList[0] and candModeList[1] are derived as follows:

$$\text{candModeList}[0]=\text{candIntraPredModeA} \quad (2\text{-}38)$$

$$\text{candModeList}[1]=\text{candIntraPredModeB} \quad (2\text{-}39)$$

f. If candModeList[0] is equal to INTRA_ANGULAR18, candModeList[2] is derived as follows:

$$\text{candModeList}[2]=\text{candModeList}[1]\\ ==\text{INTRA\_ANGULAR50?INTRA\_ANGULAR2}:\\ \text{INTRA\_ANGULAR50} \quad (2\text{-}40)$$

g. Otherwise, if candModeList[0] is equal to INTRA_ANGULAR50, candModeList[2] is derived as follows:

$$\text{candModeList}[2]=\text{candModeList}[1]\\ ==\text{INTRA\_ANGULAR18?INTRA\_ANGULAR2}:\\ \text{INTRA\_ANGULAR18} \quad (2\text{-}41)$$

h. Otherwise, candModeList[2] is derived as follows:

$$\text{candModeList}[2]=\text{candModeList}[1]\\ ==\text{INTRA\_ANGULAR50?INTRA\_ANGULAR18}:\\ \text{INTRA\_ANGULAR50} \quad (2\text{-}42)$$

4. If a value of intra_luma_mpm_flag is 1, decode a value of mpm_idx from the bitstream, the intra mode is derived from candModeList[mpm_idx].
5. Otherwise, an intra mode has been derived from non-MPM fixed length decoding.
6. An intra prediction process use the derived intra mode and the corresponding reference sample line is performed.

It is also worth noting that for a mode to be inserted, a pruning check is performed. If a same mode has been already in the candModeList, then the candidate mode in the default mode list is skipped. The insertion process is continued until the 6 entries are all filled in the candModeList. It is worth noting that for deriving angular mode's neighboring modes, two forms are used with different modular operations, i.e.:

Form 1: $(\text{Ang}-1) \rightarrow 2+((\text{Angular}+61)\%\ 64);$
$(\text{Ang}+1) \rightarrow 2+((\text{Angular}-1)\%\ 64)$ Form 2: $(\text{Ang}-1) \rightarrow 2+((\text{Angular}+62)\%\ 65);$
$(\text{Ang}+1) \rightarrow 2+((\text{Angular}-1)\%\ 65)$ Either of them can be used for 6-MPM list construction, The above mentioned workflow is just one example picking up Form 2 for the case when reference line index equals to 0, and Form 1 for the case when reference line index is not equal to 0.

Embodiment [5] of the disclosure uses the following steps:
1. Identify whether the current block is on the CTU boundary.
   v. If so (its above block locate in another CTU), then intra_luma_ref_idx is equal to 0
   vi. Otherwise, intra_luma_ref_idx is decoded from the bitstream.
2. If intra_luma_ref_idx is equal to 0, use the 6 MPM approach, which further consisting of following steps:
   vii. Derive intra_luma_mpm_flag from the bitstream.
   viii. If intra_luma_mpm_flag is equal to true, then a 6 MPM is constructed.
   ix. Otherwise (i.e. intra_luma_mpm_flag is equal to false), then a truncated binary coded intra mode is derived by the decoder.
   x. The 6 MPM is constructed by inserting the following items as specified in THE FIRST MPM SOLUTION:
      The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX are derived as follows:

The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:
  If one or more of the following conditions are true, candIntraPredModeX is set equal to INTRA_DC.
    The variable availableX is equal to FALSE.
    CuPredMode[xNbX][yNbX] is not equal to MODE_INTRA.
    X is equal to B and yCb−1 is less than ((yCb>>CtbLog2SizeY)<<CtbLog2SizeY).
  Otherwise, candIntraPredModeX is set equal to IntraPredModeY[xNbX][yNbX].
The candModeList[x] with x=0 . . . 5 is derived as follows:

candModeList[0]=candIntraPredModeA  (8-1)

candModeList[1]=!candIntraPredModeA  (8-2)

candModeList[2]=INTRA_ANGULAR50  (8-3)

candModeList[3]=INTRA_ANGULAR18  (8-4)

candModeList[4]=INTRA_ANGULAR46  (8-5)

candModeList[5]=INTRA_ANGULAR54  (8-6)

If candIntraPredModeB is equal to candIntraPredModeA, the following applies:
    If candIntraPredModeA is larger than 1, candModeList[x] with x=0 . . . 5 is derived as follows:

candModeList[0]=candIntraPredModeA  (8-7)

candModeList[1]=INTRA_PLANAR  (8-8)

candModeList[2]=INTRA_DC  (8-9)

candModeList[3]=2+((candIntraPredModeA+62)% 65)  (8-10)

candModeList[4]=2+((candIntraPredModeA−1)% 65)  (8-11)

candModeList[5]=2+((candIntraPredModeA+61)% 65)  (8-12)

Otherwise (candIntraPredModeB is not equal to candIntraPredModeA), the following applies:
    candModeList[0] and candModeList[1] are derived as follows:

candModeList[0]=candIntraPredModeA  (8-13)

candModeList[1]=candIntraPredModeB  (8-14)

Set the variable biggerIdx is as follows biggerIdx=candModeList[0]>candModeList[1]?0:1  (8-15)

If both of candIntraPredModeA and candIntraPredModeB are larger than 1, candModeList[x] with x=2 . . . 5 is derived as follows:

candModeList[2]=INTRA_PLANAR  (8-16)

candModeList[3]=INTRA_DC  (8-17)

If candModeList[biggerIdx]−candModeList[!biggerIdx] is equal to neither 64 nor 1, the following applies:

candModeList[4]=2+((candModeList[biggerIdx]+62)% 65)  (8-18)

candModeList[5]=2+((candModeList[biggerIdx]−1)% 65)  (8-19)

Otherwise, the following applies:

candModeList[4]=2+((candModeList[biggerIdx]+61)% 65)  (8-20)

candModeList[5]=2+(candModeList[biggerIdx]% 65)  (8-21)

Otherwise, if sum of candIntraPredModeA and candIntraPredModeB is larger or equal to 2, the following applies:

candModeList[2]=!candModeList[!biggerIdx]  (8-22)

candModeList[3]=2+((candModeList[biggerIdx]+62)% 65)  (8-23)

candModeList[4]=2+((candModeList[biggerIdx]−1)% 65)  (8-24)

candModeList[5]=2+((candModeList[biggerIdx]+61)% 65)  (8-25)

3. Otherwise (intra_luma_ref_idx is not equal to 0), intra_luma_mpm_flag is set to 1. A 6 MPM list is constructed as follows:
The neighbouring locations (xNbA, yNbA) and (xNbB, yNbB) are set equal to (xCb−1, yCb+cbHeight−1) and (xCb+cbWidth−1, yCb−1), respectively.
For X being replaced by either A or B, the variables candIntraPredModeX are derived as follows:
  The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
  The candidate intra prediction mode candIntraPredModeX is derived as follows:
    If one or more of the following conditions are true, candIntraPredModeX is set equal to INTRA_DC.
      The variable availableX is equal to FALSE.
      CuPredMode[xNbX][yNbX] is not equal to MODE_INTRA.
      X is equal to B and yCb−1 is less than ((yCb>>CtbLog2SizeY)<<CtbLog2SizeY).
    Otherwise, candIntraPredModeX is set equal to IntraPredModeY[xNbX][yNbX].
  i. candIntraPredModeB is less than or equal to INTRA_DC and candIntraPredModeA is less than or equal to INTRA_DC, candModeList[x] with x=0 . . . 5 is derived as follows:

candModeList[0]=INTRA_ANGULAR2  (2-43)

candModeList[1]=INTRA_ANGULAR18  (2-44)

candModeList[2]=INTRA_ANGULAR50  (2-45)

candModeList[3]=INTRA_ANGULAR46 candModeList[4]=INTRA_ANGULAR54 candModeList[5]=INTRA_ANGULAR66 j. Otherwise, if candIntraPredModeB is less than or equal to INTRA_DC, candModeList[x] with x=0 . . . 5 is derived as follows:

candModeList[0]=candIntraPredModeA  (2-46)

candModeList[1]=2+((candIntraPredModeA+61)% 64)  (2-47)

candModeList[2]=2+((candIntraPredModeA−1)% 64)  (2-48)

candModeList[3]=2+((candIntraPredModeA+60)% 64)

candModeList[4]=2+((candIntraPredModeA+0)% 64)

candModeList[5]=2+((candIntraPredModeA+59)% 64)

k. Otherwise, if candIntraPredModeA is less than or equal to INTRA_DC, candModeList[x] with x=0 . . . 2 is derived as follows:

candModeList[0]=candIntraPredModeB  (2-49)

candModeList[1]=2+((candIntraPredModeB+61)% 64)  (2-50)

candModeList[2]=2+((candIntraPredModeB−1)% 64)  (2-51)

candModeList[3]=2+((candIntraPredModeB+60)% 64)

candModeList[4]=2+((candIntraPredModeB+0)% 64)

candModeList[5]=2+((candIntraPredModeB+59)% 64)

l. Otherwise, andModeList[x] with x=0 . . . 5 is derived as follows:
m. candModeList[0] and candModeList[1] are derived as follows:

candModeList[0]=candIntraPredModeA  (2-52)

candModeList[1]=candIntraPredModeB  (2-53)

candModeList[2]=2+((candIntraPredModeA+61)% 64)

candModeList[3]=2+((candIntraPredModeA—1)% 64)

candModeList[4]=2+((candIntraPredModeB+61)% 64)

candModeList[5]=2+((candIntraPredModeB−1)% 64)

4. If intra_luma_mpm_flag is 1, decode mpm_idx from the bitstream, The intra mode is derived from candModeList[mpm_idx].
5. Otherwise, an intra mode has been derived from non-MPM truncated binary decoding.
6. An intra prediction process use the derived intra mode and the corresponding reference sample line is performed.

It is also worth noting that for a mode to be inserted, a pruning check is performed. If a same mode has been already in the candModeList, then the candidate mode to be inserted is skipped.

In this embodiment, when both candIntraPredModeA and candIntraPredModeA are angular (i.e. the last case) and they are neighboring angular modes, then insertion candidates are pick up from their neighboring angular modes, i.e. candIntraPredModeA-1, candIntraPredModeA+1, candIntraPredModeB-1, candIntraPredModeB+1, candIntraPredModeA-2, candIntraPredModeA+2, candIntraPredModeB-2, candIntraPredModeB+2 until the MPM list is full using prunning.

It is worth noting that for deriving angular mode's neighboring modes, two forms are used with different modular operations, i.e.:

Form 1: (Ang−1)→2+((Angular+61)% 64); (Ang+1)→2+((Angular−1)% 64)

Form 2: (Ang−1)→2+((Angular+62)% 65); (Ang+1)→2+((Angular−1)% 65)

Either of them can be used for 6-MPM list construction, The above mentioned workflow is just one example picking up Form 2 for the case when reference line index equals to 0, and Form 1 for the case when reference line index is not equal to 0.

A FIRST MPM SOLUTION for constructing 6 MPM is defined as follows:
1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
   The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
   The candidate intra prediction mode candIntraPredModeX is derived as follows:
   If one or more of the following conditions are true, candIntraPredModeX is set equal to INTRA_PLANAR.
   The variable availableX is equal to FALSE.
   CuPredMode[xNbX][yNbX] is not equal to MODE_INTRA.
   X is equal to B and yCb−1 is less than ((yCb>>CtbLog2SizeY)<<CtbLog2SizeY).
   Otherwise, candIntraPredModeX is set equal to IntraPredModeY[xNbX][yNbX].
3. The candModeList[x] with x=0 . . . 5 is derived as follows:

candModeList[0]=candIntraPredModeA  (8-1)

candModeList[1]=!candIntraPredModeA  (8-2)

candModeList[2]=INTRA_ANGULAR50  (8-3)

candModeList[3]=INTRA_ANGULAR18  (8-4)

candModeList[4]=INTRA_ANGULAR46  (8-5)

candModeList[5]=INTRA_ANGULAR54  (8-6)

If candIntraPredModeB is equal to candIntraPredModeA, the following applies:
  If candIntraPredModeA is larger than 1, candModeList[x] with x=0 . . . 5 is derived as follows:

candModeList[0]=candIntraPredModeA  (8-7)

candModeList[1]=INTRA_PLANAR  (8-8)

candModeList[2]=INTRA_DC  (8-9)

candModeList[3]=2+((candIntraPredModeA+62)% 65)  (8-10)

candModeList[4]=2+((candIntraPredModeA−1)% 65)  (8-11)

candModeList[5]=2+((candIntraPredModeA+61)% 65)  (8-12)

Otherwise (candIntraPredModeB is not equal to candIntraPredModeA), the following applies: candModeList[0] and candModeList[1] are derived as follows:

candModeList[0]=candIntraPredModeA  (8-13)

candModeList[1]=candIntraPredModeB  (8-14)

Set the variable biggerIdx is as follows biggerIdx=candModeList[0]>candModeList[1]?0:1  (8-15)

If both of candIntraPredModeA and candIntraPredModeB are larger than 1, candModeList[x] with x=2 . . . 5 is derived as follows:

candModeList[2]=INTRA_PLANAR  (8-16)

candModeList[3]=INTRA_DC  (8-17)

If candModeList[biggerIdx]−candModeList[!biggerIdx] is equal to neither 64 nor 1, the following applies:

candModeList[4]=2+((candModeList[biggerIdx]+62)% 65)  (8-18)

candModeList[5]=2+((candModeList[biggerIdx]−1)% 65)  (8-19)

Otherwise, the following applies:

candModeList[4]=2+((candModeList[biggerIdx]+61)% 65)  (8-20)

candModeList[5]=2+(candModeList[biggerIdx]% 65)  (8-21)

Otherwise, if sum of candIntraPredModeA and candIntraPredModeB is larger or equal to 2, the following applies:

candModeList[2]=!candModeList[!biggerIdx]  (8-22)

candModeList[3]=2+((candModeList[biggerIdx]+62)% 65)  (8-23)

candModeList[4]=2+((candModeList[biggerIdx]−1)% 65)  (8-24)

candModeList[5]=2+((candModeList[biggerIdx]+61)% 65)  (8-25)

It is worth noting that for deriving angular mode's neighboring modes, two forms are used with different modular operations, i.e.:

Form 1: (Ang−1)→2+((Angular+61)% 64); (Ang+1)→2+((Angular−1)% 64)

Form 2: (Ang−1)→2+((Angular+62)% 65); (Ang+1)→2+((Angular−1)% 65)

Either of them can be used for 6-MPM list construction, the above mentioned workflow is just one example picking up Form 2.

Three embodiments are proposed to use multiple reference lines with a 6 MPM list.

[1] use a unified 6 MPM list construction as used in the FIRST MPM SOLUTION, planar and DC modes are always included in the constructed 6 MPM. However, different binarization are used for signalling mpm_idx, based on the reference line index used.

a. When reference line index is equal to 0, the value of mpm_idx ranges between [0, 5], inclusive, corresponding to the cases when the intra mode is the first, second, . . . , until the last entry of the MPM list.

b. When reference line index is not equal to 0, the same 6 MPM list in THE FIRST MPM SOLUTION that always include planar and DC is used. However, planar and DC will never be chosen. Based on this fact, before a value of mpm_idx is signalled, a shift operation is used to exclude the indexes pointing to planar and DC mode. After the shift operation, the value of mpm_idx ranges between [0,3], inclusive, since two modes (planar and DC) are excluded.

Figure 14:
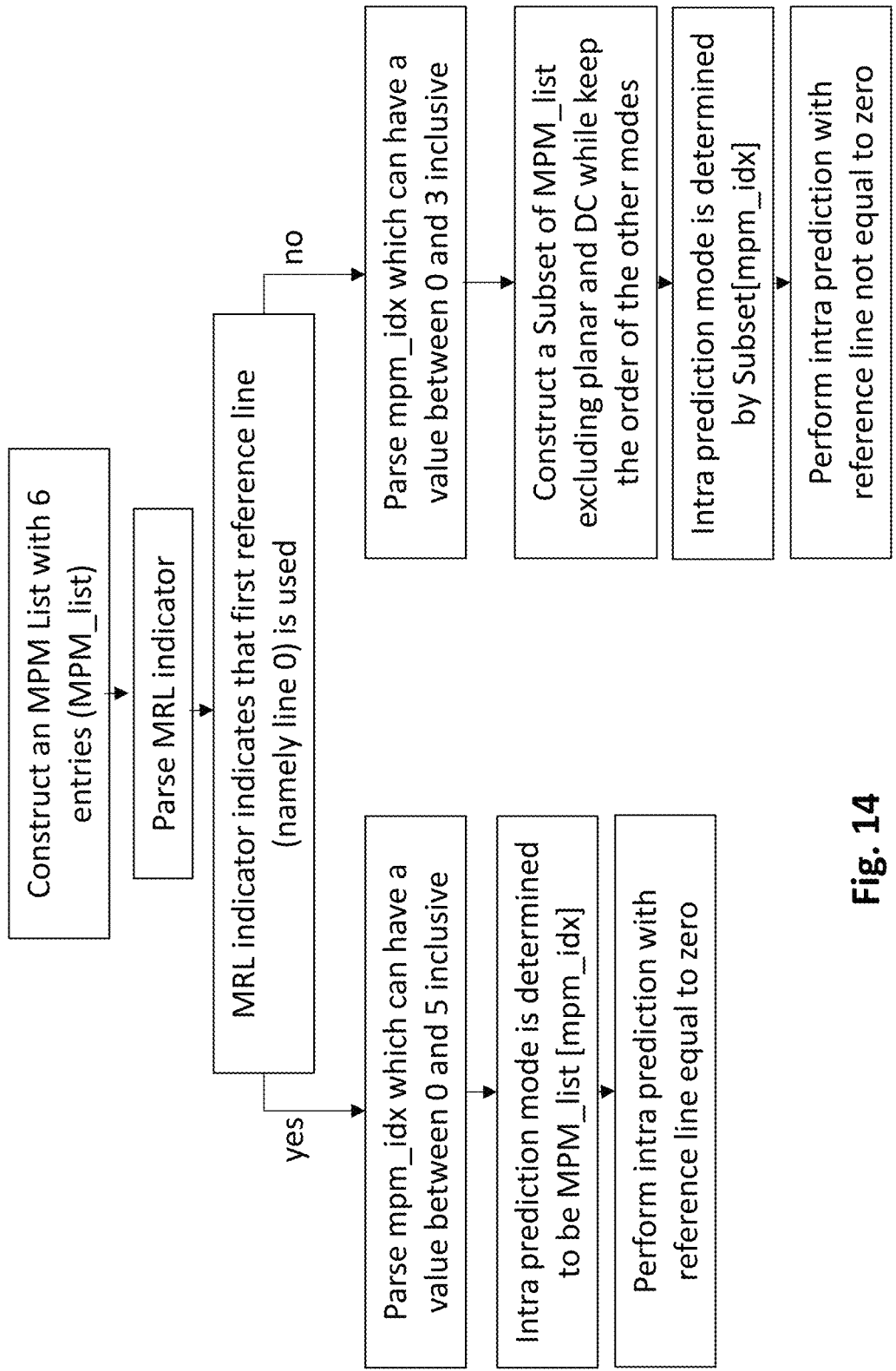
FIGS. 14-16 show flowcharts of methods of performing intra-prediction according to some embodiments.

It is noted that in an alternative implementation that mpm_idx ranges between [0,N], where N is smaller than or equal to 3.

c. An example is raised for a better explanation of this idea.

i. Suppose the unified 6 MPM list is (0, 1, 50, 18, 46, 54), and the value of mpm_idx (before shift operation) is 2. It represents the current block use intra prediction mode 50, the third entry of MPM list as the entry's index starts from 0.

ii. As the planar (0) and DC (1) modes will never be chosen, the shift operation is applied for the value of mpm_idx. The number of planar and DC before the original mpm_idx (2) is counted, and is deducted from the value of mpm_idx. Therefore, after this shift operation, the new value of mpm_idx is 0. In one implementation of Truncated unary coding, a value of 0 requires only 1 bit (1) to signal, while a value of 2 require 3 bits (001).

iii. In the decoder, after parsing the signalled value of mpm_idx (0), it indicates the position of the first entry excluding planar and DC modes, which corresponds to position 2. Therefore, after considering planar and DC in the MPM list, the real intra mode signalled by the mpm_idx is intra prediction mode 50.

d. A workflow chart is provided in FIG. 14.

e. The value of mpm_idx signalling is triggered only when MPM_FLAG is true (i.e., the intra mode is derived using the MPM list). If the MPM_FLAG is not true, truncated binary coding is used for intra mode that is not in the MPM list.

i. When a value of reference line index is not equal to zero, MPM_FLAG is not signalled but derived as true, because only the modes in the MPM list (excluding planar and DC) are considered for the current block, i.e. the intra mode used will always be in the MPM list.

f. According to an embodiment, the MPM index (mpm_idx) is binarized using a truncated unary coding scheme. As an example, if the largest value to mpm_idx is 6 or 4, depending on the reference line index, the following value to binary codeword assignments can be used.

g.

| Mpm_idx value | Binarization when reference line index is zero | Binarization when reference line index is not zero |
|---|---|---|
| 0 | 1 | 1 |
| 1 | 01 | 01 |
| 2 | 001 | 001 |
| 3 | 0001 | 000 |
| 4 | 00001 | |
| 5 | 00000 | |

The benefits of this proposal are summarized as follows:

A unified MPM list construction method is applied regardless the used reference line index. Therefore, the complexity of MPM list construction is reduced.

Excluding Planar and DC from MPM list is done by mpm_idx binarization. The bins require for coding the mpm_idx is reduced by excluding planar and DC modes when the reference line index is not equals to 0.

A unified truncated binary coding is achieved implicitly. As for the cases of reference line index not equals to 0, the truncated binary coding would never be triggered because the intra mode used is constrained in the MPM list.

Figure 15:
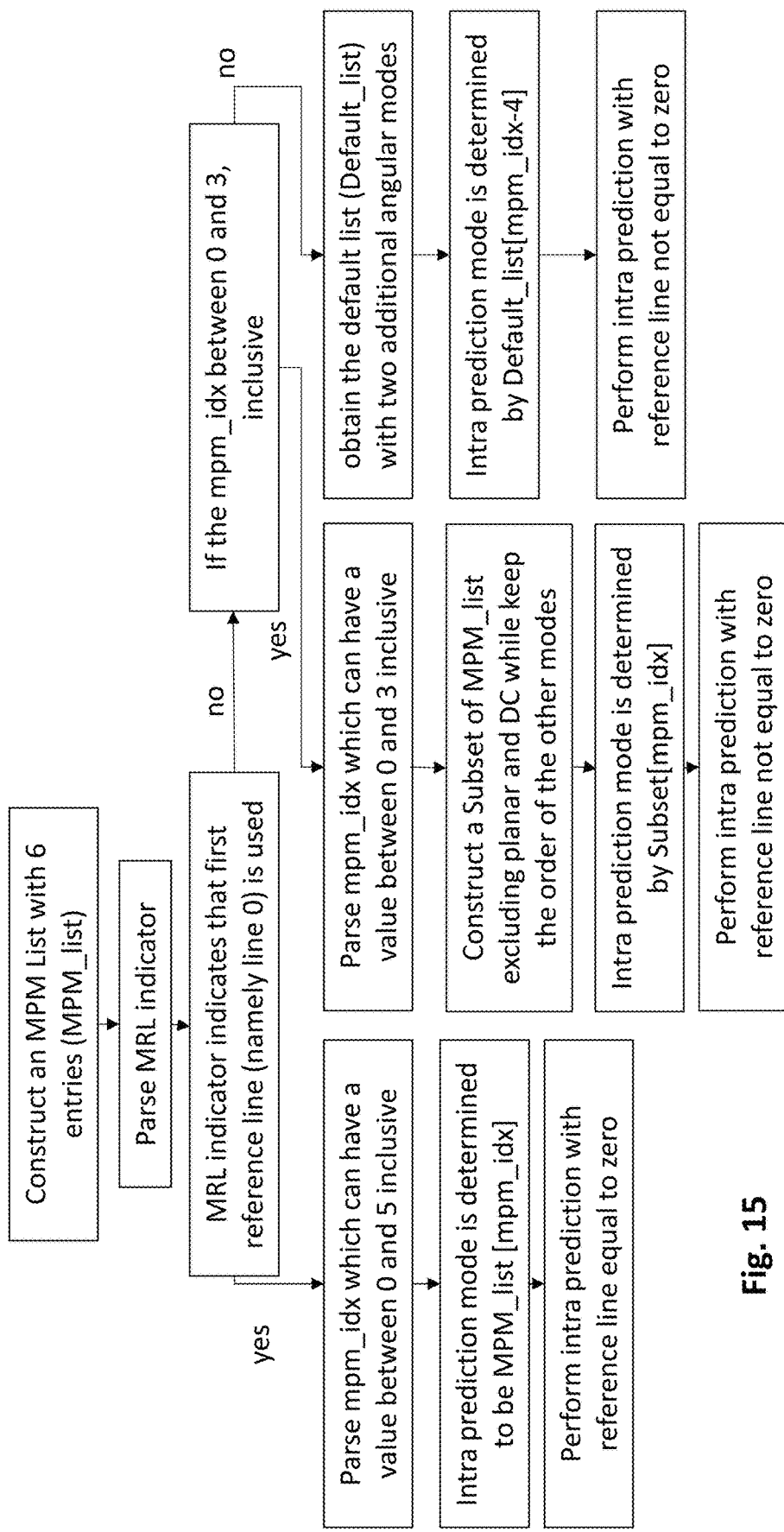

[2] This proposal unified the maximum value of mpm_idx based on embodiment [1]. The modification to [1] is:

a. When a value of reference line index is not equal to 0, after a value of mpm_idx is applied with shift operation, two additional angular modes (and they are different from any intra mode in the 6-MPM list) are considered. In this way, the value of the mpm_idx ranges between [0, 5], inclusive, as the case when a value of reference line index equals to 0.

i. When a value of mpm_idx equals to a value between [0, 3], inclusive, the intra mode coding is the same to above embodiment.

ii. When a value of mpm_idx equals to 4 or 5, one of the two additional angular intra modes are selected. If a value of mpm_idx equals to 4, the first angular mode in the two additional angular modes is selected; if a value of mpm_idx equals to 5, the second angular mode in the two additional angular modes is selected.

b. A workflow chart of this embodiment is provided in FIG. 15.

Figure 16:
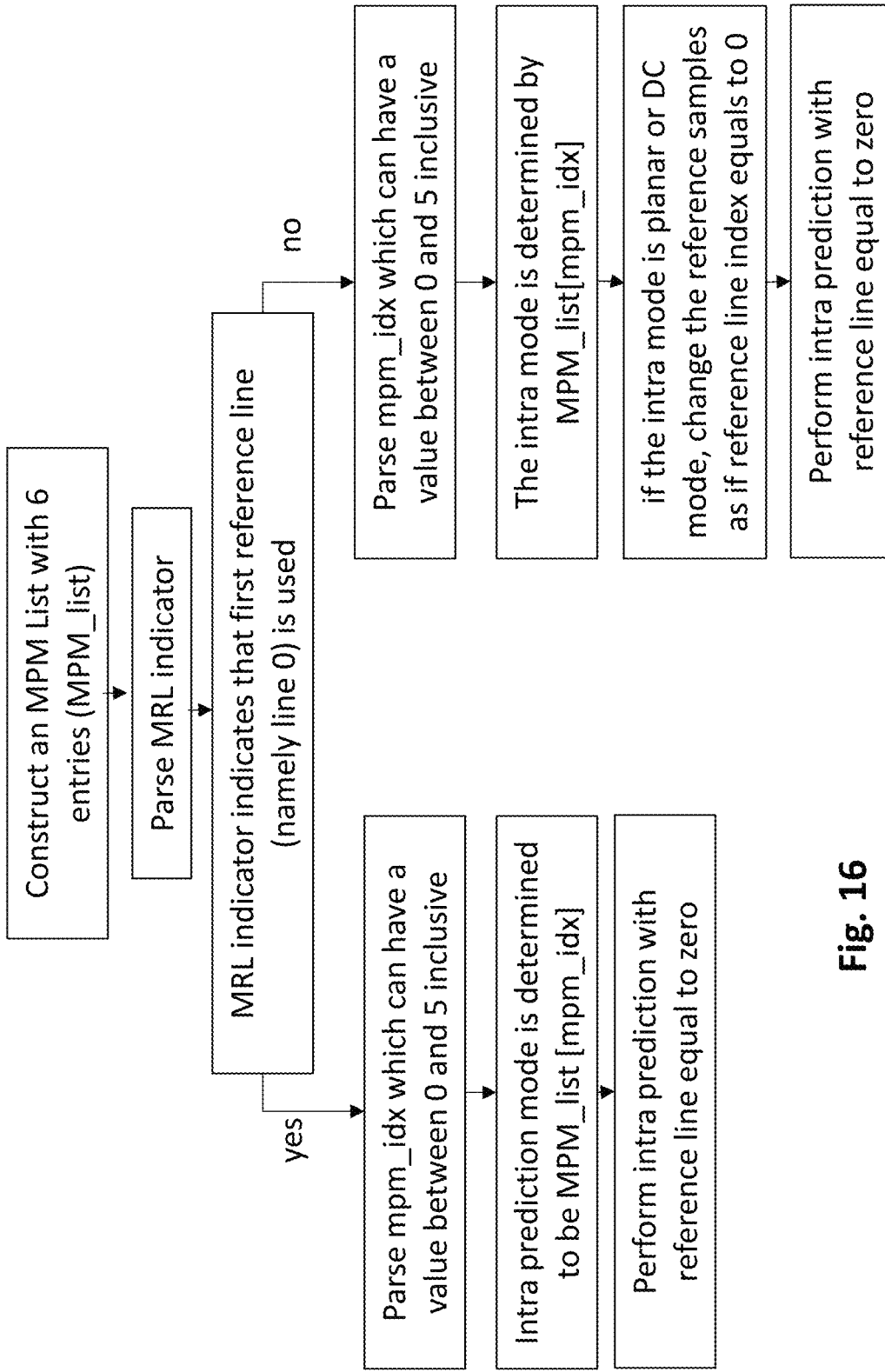

[3] The two additional angular modes are selected from a default mode set (50, 18, 46, 54, 2, 34, 66). It shall be guaranteed that the two additional angular modes are different from any of the angular modes in the MPM list. According to one embodiment:

a. An MPM list is constructed by inserting candidate intra prediction modes in order according to a set of predetermined rules.

b. An mpm_index, which indicates the index of the intra prediction mode in an MPM list is inserted in the bitstream (or parsed by the decoder).

c. A value of a reference line index is inserted in the bitstream (or parsed by the decoder). Alternatively, the reference line index is inferred by the decoder hence no indicator is inserted in the bitstream.

d. It is noted that steps a, b and c can be performed in any order.

e. If the value of the reference line index is determined to be zero, then the pixel samples that are closest to the current coding block (reference line zero) are used in intra prediction of the current block and the intra prediction mode is determined by the entry in the MPM list indicated by mpm_index.

f. Otherwise (if the reference line index is determined NOT to be zero)

i. If the entry in the MPM list that is indicated by mpm_index is equal to Planar mode or DC mode, then the pixel samples that are closest to the current coding block (reference line zero) are used in intra prediction of the current block and the intra prediction mode is determined by the entry in the MPM list indicated by mpm_index. It is noted that in this case the intra prediction mode is determined to be Planar or DC. If the entry in the MPM list that is indicated by mpm_index is not equal to Planar mode or DC mode, then the pixel samples that are not closest to the current coding block (reference line not equal to zero) are used in intra prediction of the current block, and the intra prediction mode is determined by the entry in the MPM list indicated by mpm_index. It is noted that in this case the intra prediction mode is determined to be not equal to Planar or DC.

g. Advantageously the maximum value of the mpm_idx is 5, which means that 6 entries are present in the MPM list.

h. A workflow chart is provided in FIG. 16.

According to one example of deriving intra mode coding, it comprises the following steps:

1. Identify whether the current block is on the CTU boundary.

If so (above block of the current block is located in another CTU), then a value of intra_luma_ref_idx is set equal to 0;

Otherwise, a value of intra_luma_ref_idx is decoded from the bitstream.

2. If the value of the intra_luma_ref_idx equals to 0

Derive a value of intra_luma_mpm_flag from the bitstream.

If intra_luma_mpm_flag is true (e.g. a value of intra_luma_mpm_flag is equal to 1), then a 6 MPM list as specified in the FIRST MPM SOLUTION is constructed.

1. A value of an index mpm_idx is parsed from the bitstreams

2. The intra mode is derived as MPM_list[mpm_idx].

Otherwise (i.e. intra_luma_mpm_flag is equal to false, e.g. a value of intra_luma_mpm_flag is equal to 0), then a truncated binary coded intra mode is derived by the decoder using truncated binary decoding.

3. Otherwise, (if the intra_luma_ref_idx not equals to 0):

intra_luma_mpm_flag is set to true (e.g. a value of intra_luma_mpm_flag is set equal to 1), a 6 MPM list as specified in the FIRST MPM SOLUTION is constructed, pick up angular modes in the constructed MPM list and constructed an updated MPM_list_updated, the new MPM_list_updated comprising only angular modes in the MPM list
1. An index mpm_idx is parsed from the bitstreams;
2. The intra mode is derived as MPM_list_updated [mpm_idx].

In the following further embodiments described herein where the numbering of the embodiments may not necessarily coincide with the numbering used in the previous text.

Embodiment 1. A method of decoding implemented by a decoding device, comprising:
determining a value of a reference line index for the current block;
parsing from a bitstream a MPM flag and a mode indication information for indicating the intra prediction mode of a current block; wherein the MPM flag indicates whether the intra prediction mode of the current block is derived from the MPM list or not;
constructing a Most Probable Mode, MPM list for intra prediction according to the value of the reference line index for the current block;
determining the intra prediction mode for the current block based on the value of reference line index and the mode indication information; wherein the mode indication information (such as mpm_idx or non-mpm mode) is parsed by a corresponding decoding way according to the value of the MPM flag and the value of the reference line index.

Embodiment 2. The method of embodiment 1, wherein the step of determining a value of a reference line index for the current block, comprising:
determining that the value of the reference line index for the current block is a first value (such as 0), when no reference line index is parsed from the bitstream; or
determining that the value of the reference line index for the current block is a first value (such as 0) or the value of the reference line index for the current block is not equal to the first value (such as 0), when the reference line index is parsed from the bitstream.

Embodiment 3. The method of embodiment 1 or 2, the method further comprising: parsing from the bitstream a reference line index;
wherein determining a value of a reference line index for the current block, comprises: determining the value of a reference line index for the current block based on the reference line index parsed from the bitstream.

Embodiment 4. The method of any one of the preceding embodiments, wherein the step of parsing from a bitstream a mode indication information, comprising:
parse a truncated binary code to determine an intra prediction mode of the current picture block when the value of the MPM flag is equal to a third value (such as 0) and the value of the reference line index is equal to the first value (such as 0); or
parse a truncated unary code to determine an intra prediction mode of the current picture block when the value of the MPM flag is equal to a fourth value (such as 1) and the value of the reference line index is equal to the first value (such as 0); or
parse a truncated unary code to determine an intra prediction mode of the current picture block when the value of the MPM flag is equal to a fourth value (such as 1) and the value of the reference line index is not equal to the first value (such as 1, 2, 3).

Embodiment 5. The method of any one of the preceding embodiments, wherein the step of constructing a Most Probable Mode, MPM, list for intra prediction according to the value of the reference line index for the current block, comprising:
when the value of a reference line index for the current block is equal to the first value (such as 0), constructing a first 6-MPM list, wherein a planar mode and a DC mode are included in the first 6-MPM list; or
when the value of a reference line index for the current block is not equal to the first value (such as 1, 2, 3), constructing a second 6-MPM list, wherein a planar mode and a DC mode are not included in the second 6-MPM list; or,
wherein the step of constructing a Most Probable Mode, MPM, list for intra prediction according to the value of the reference line index for the current block, comprising:
when the value of a reference line index for the current block is equal to the first value (such as 0), constructing a 6-MPM list, wherein a planar mode and a DC mode are included in the first 6-MPM list; or
when the value of a reference line index for the current block is not equal to the first value (such as 1, 2, 3), constructing a 3-MPM list, wherein a planar mode and a DC mode are not included in the 3-MPM list.

Embodiment 6. The method of any one of the preceding embodiments, wherein when a variable is parsed from the bitstream ranging from 0-2, the value of the reference line index is determined according a following lookup table:

| intra_luma_ref_idx[ x0 ][ y0 ] | IntraLumaRefLineIdx[ x0 ][ y0 ] |
|---|---|
| 0 | 0 |
| 1 | 1 |
| 2 | 3 |

Embodiment 7. The method of any one of the preceding embodiments, further comprising: predicting sample values of the current picture block using the determined intra prediction mode and the determined reference samples in the corresponding reference line to provide a predicted picture block (105).

Embodiment 8. The method according to embodiment 7, further comprising:
decoding the current picture block on the basis of the predicted picture block and the determined intra prediction mode.

Embodiment 9. A method of encoding implemented by an encoding device, comprising: determining a value of a reference line index for a current block;
constructing a Most Probable Mode, MPM list for intra prediction according to the value of the reference line index for the current block;
determining the intra prediction mode for the current block based on the value of reference line index;
generating a bitstream including a MPM flag and a mode indication information for indicating the intra prediction mode of the current block; wherein the MPM flag indicates whether the intra mode of the current block is derived from the MPM list or not and wherein the mode indication information (such as mpm_idx or non-mpm_mode) is signaled by a corresponding coding way according to the value of the MPM flag and the value of the reference line index.

Embodiment 10. The method of embodiment 9, wherein the step of constructing a Most Probable Mode, MPM, list for intra prediction according to the value of the reference line index for the current block, comprising:
when the value of a reference line index for the current block is equal to the first value (such as 0), constructing a first 6-MPM list, wherein a planar mode and a DC mode are included in the first 6-MPM list; or when the value of a reference line index for the current block is not equal to the first value (such as 1, 2, 3), constructing a second 6-MPM list, wherein a planar mode and a DC mode are not included in the second 6-MPM list; or, wherein the step of constructing a Most Probable Mode, MPM, list for intra prediction according to the value of the reference line index for the current block, comprising: when the value of a reference line index for the current block is equal to the first value (such as 0), constructing a 6-MPM list, wherein a planar mode and a DC mode are included in the first 6-MPM list; or when the value of a reference line index for the current block is not equal to the first value (such as 1, 2, 3), constructing a 3-MPM list, wherein a planar mode and a DC mode are not included in the 3-MPM list.

Embodiment 11. The method of embodiment 9, wherein the step of constructing a Most Probable Mode, MPM, list for intra prediction according to the value of the reference line index for the current block, comprising:

when the value of a reference line index for the current block is equal to the first value (such as 0), constructing a first 6-MPM list, wherein a planar mode and a DC mode are included in the first 6-MPM list; or when the value of a reference line index for the current block is not equal to the first value (such as 1, 2, 3), constructing a second 6-MPM list, wherein a planar mode and a DC mode are not included in the second 6-MPM list; or, wherein the step of constructing a Most Probable Mode, MPM, list for intra prediction according to the value of the reference line index for the current block, comprising:

when the value of a reference line index for the current block is equal to the first value (such as 0), constructing a 6-MPM list, wherein a planar mode and a DC mode are included in the first 6-MPM list; or when the value of a reference line index for the current block is not equal to the first value (such as 1, 2, 3), constructing a 3-MPM list, wherein a planar mode and a DC mode are not included in the 3-MPM list.

Embodiment 12. The method of any one of the preceding embodiments, wherein when the value of the MPM flag is equal to a third value (such as 0) and the value of the reference line index is equal to the first value (such as 0), the mode indication information (such as non-mpm mode) is signaled using a truncated binary code; or when the value of the MPM flag is equal to a fourth value (such as 1) and the value of the reference line index is equal to the first value (such as 0), the mode indication information (such as mpm_idx) is signaled using a truncated unary code; or when the value of the reference line index is not equal to the first value (such as 1, 2, 3) and the value of the MPM flag is equal to a fourth value (such as 1), the mode indication information (such as mpm_idx) is signaled using a truncated unary code.

Embodiment 13. The method of any one of the preceding embodiments, wherein when the value of a reference line index for the current block is not equal to a first value (such as 0), the reference line index, the MPM flag and the mode indication information are included in the bitstream; or when the value of a reference line index for the current block is equal to the first value (such as 0), the MPM flag and the mode indication information are included in the bitstream.

Embodiment 14. The method of any one of the preceding embodiments, further comprising: predicting sample values of the current picture block using the determined intra prediction mode and the determined reference samples in the corresponding reference line to provide a predicted picture block (105).

Embodiment 15. The method according to embodiment 13, further comprising:

encoding the current picture block on the basis of the predicted picture block and the determined intra prediction mode.

Embodiment 16. The method of any one of the preceding embodiments, wherein if the nearest reference line is selected, then signal a value 0; if the second nearest reference line is selected, then signal a value 1; if the fourth nearest line is selected, the signal a value 2. The third nearest line is not selected by the encoder. The metric to select the reference line is based on RD cost, as normal encoder does.

Embodiment 17. An encoder (20) comprising processing circuitry for carrying out the method according to any one of embodiments 9 to 16.

Embodiment 18. A decoder (30) comprising processing circuitry for carrying out the method according to any one of embodiments 1 to 8.

Embodiment 19. A computer program product comprising a program code for performing the method according to any one of embodiments 1 to 16.

Embodiment 20. A decoder, comprising:

one or more processors; and a non-transitory computer-readable storage medium coupled to the processors and storing programming for execution by the processors, wherein the programming, when executed by the processors, configures the decoder to carry out the method according to any one of embodiments 1 to 8.

Embodiment 21. An encoder, comprising:

one or more processors; and a non-transitory computer-readable storage medium coupled to the processors and storing programming for execution by the processors, wherein the programming, when executed by the processors, configures the encoder to carry out the method according to any one of embodiments 9 to 16.

Embodiment 22. A method of decoding implemented by a decoding device, comprising:

determining a value of a reference line index for the current block;

parsing from a bitstream a MPM flag and a mode indication information for indicating the intra prediction mode of a current block; wherein the MPM flag indicates whether the intra mode of the current block is derived from the MPM list or not;

constructing a 6-Most Probable Mode, MPM list for intra prediction;

determining the intra prediction mode for the current block based on the mode indication information; wherein the mode indication information (such as mpm_idx or non-mpm mode) is parsed by a corresponding decoding way according to the value of the MPM flag and the value of the reference line index.

Embodiment 23. The method of embodiment 22, wherein the step of determining a value of a reference line index for the current block, comprising:

determining that the value of the reference line index for the current block is a first value (such as 0), when no reference line index is parsed from the bitstream; or determining that the value of the reference line index for the current block is equal to the first value (such as 0) or the value of the reference line index for the current block is not equal to the first value (such as 0), when the reference line index is parsed from the bitstream.

Embodiment 24. The method of embodiment 22 or 23, the method further comprising: parsing from the bitstream a reference line index;
wherein determining a value of a reference line index for the current block, comprises: determining the value of a reference line index for the current block based on the reference line index parsed from the bitstream.

Embodiment 25. The method of any one of the preceding embodiments, wherein the step of parsing from a bitstream a mode indication information, comprising:
parse a truncated binary code to determine an intra prediction mode of the current picture block when the value of the MPM flag is equal to a third value (such as 0) and the value of the reference line index is equal to the first value (such as 0); or
parse a truncated unary code to determine an intra prediction mode of the current picture block when the value of the MPM flag is equal to a fourth value (such as 1) and the value of the reference line index is equal to the first value (such as 0); or
parse a truncated unary code to determine an intra prediction mode of the current picture block when the value of the reference line index is not equal to the first value (such as 1, 2, 3) and the value of the MPM flag is equal to a fourth value (such as 1).

Embodiment 26. The method of any one of the preceding embodiments, wherein the step of constructing a Most Probable Mode, MPM, list for intra prediction, comprising:
constructing a first 6-MPM list, wherein a planar mode and a DC mode are included in the first 6-MPM list; or
constructing a first 6-MPM list, wherein a planar mode and a DC mode are not included in the first 6-MPM list.

Embodiment 27. The method of any one of the preceding embodiments, wherein when a variable is parsed from the bitstream ranging from 0-2, the value of the reference line index is determined according a following lookup table:

| intra_luma_ref_idx[ x0 ][ y0 ] | IntraLumaRefLineIdx[ x0 ][ y0 ] |
|---|---|
| 0 | 0 |
| 1 | 1 |
| 2 | 3 |

Embodiment 28. The method of any one of the preceding embodiments, further comprising: predicting sample values of the current picture block using the determined intra prediction mode and the determined reference samples in the corresponding reference line to provide a predicted picture block (105).

Embodiment 29. The method according to embodiment 28, further comprising: decoding the current picture block on the basis of the predicted picture block and the determined intra prediction mode.

Embodiment 30. A method of encoding implemented by an encoding device, comprising: determining a value of a reference line index for a current block;
constructing a Most Probable Mode, MPM list for intra prediction;
determining the intra prediction mode for the current block;
generating a bitstream including a MPM flag and a mode indication information for indicating the intra prediction mode of the current block; wherein the MPM flag indicates whether the intra mode of the current block is derived from the MPM list or not and wherein the mode indication information (such as mpm_idx or non-mpm_idx) is signaled by a corresponding coding way according to the value of the MPM flag and the value of the reference line index.

Embodiment 31. The method of embodiment 30, wherein the step of constructing a Most Probable Mode, MPM, list for intra prediction, comprising:
constructing a first 6-MPM list, wherein a planar mode and a DC mode are included in the first 6-MPM list; or
constructing a first 6-MPM list, wherein a planar mode and a DC mode are not included in the first 6-MPM list.

Embodiment 32. The method of any one of the preceding embodiments, wherein
when the value of the MPM flag is equal to a third value (such as 0) and the value of the reference line index is equal to the first value (such as 0), the mode indication information (such as non-mpm_idx) is signaled using a truncated binary code; or
when the value of the MPM flag is equal to a fourth value (such as 1) and the value of the reference line index is equal to the first value (such as 0), the mode indication information (such as mpm_idx) is signaled using a truncated unary code; or
when the value of the MPM flag is equal to a fourth value (such as 1) and the value of the reference line index is not equal to the first value (such as 1, 2, 3), the mode indication information (such as mpm_idx) is signaled using a truncated unary code.

Embodiment 33. The method of any one of the preceding embodiments, wherein
when the value of a reference line index for the current block is not equal to a first value (such as 0), the reference line index, the MPM flag and the mode indication information are included in the bitstream; or
when the value of a reference line index for the current block is equal to the first value (such as 0), the MPM flag and the mode indication information are included in the bitstream.

Embodiment 34. The method of any one of the preceding embodiments, further comprising: predicting sample values of the current picture block using the determined intra prediction mode and to provide a predicted picture block (105).

Embodiment 35. The method according to embodiment 34, further comprising: encoding the current picture block on the basis of the predicted picture block and the determined intra prediction mode.

Embodiment 36. The method of any one of the preceding embodiments, wherein if the nearest reference line is selected, then signal a value 0; if the second nearest reference line is selected, then signal a value 1; if the fourth nearest line is selected, the signal a value 2. The third nearest line is not selected by the encoder. The metric to select the reference line is based on RD cost, as normal encoder does.

Embodiment 37. An encoder (20) comprising processing circuitry for carrying out the method according to any one of embodiments 30 to 36.

Embodiment 38. A decoder (30) comprising processing circuitry for carrying out the method according to any one of embodiments 22 to 29.

Embodiment 39. A computer program product comprising a program code for performing the method according to any one of embodiments 22 to 36.

Embodiment 40. A decoder, comprising:
one or more processors; and
a non-transitory computer-readable storage medium coupled to the processors and storing programming for execution by the processors, wherein the programming, when executed by the processors, configures the decoder to carry out the method according to any one of embodiments 22 to 36.

Embodiment 41. An encoder, comprising:
one or more processors; and
a non-transitory computer-readable storage medium coupled to the processors and storing programming for execution by the processors, wherein the programming, when executed by the processors, configures the encoder to carry out the method according to any one of embodiments 30 to 36.

Embodiment 42. A method of decoding implemented by a decoding device, comprising: obtaining a value of a reference line index for a current block;
constructing a most probable mode, MPM, list (In an example, the quantity of values corresponding to intra-prediction modes in the MPM list is 6) for the current block;
obtaining a value of intra-prediction mode index (mpm_idx) for the current block;
when the value of the reference line index is not equal to 0 (In an example, 0 is the first value of the reference line index),
obtaining an intra prediction mode of the current block according to the MPM list for the current block and the value of the intra-prediction mode index for the current block, wherein the value of the intra-prediction mode index indicates a position, the position is corresponded to the intra prediction mode of the current block among angular intra-prediction modes in the MPM list
(In an example, when the MPM list is (13, 0, 20, 1, 45, 51), so the angular intra-prediction modes are (13, 20, 45, 51), position 0 corresponding to the first angular intra-prediction mode in the MPM list, position 1 corresponding to the second angular intra-prediction mode in the MPM list, position 2 corresponding to the third angular intra-prediction mode in the MPM list and position 3 corresponding to the fourth angular intra-prediction mode in the MPM list. When a value of the mpm_idx is 0, then the intra prediction mode for the current block is 13, or when a value of the mpm_idx is 2, then the intra prediction mode for the current block is 45. In another example, when the value of the reference line index is equal to 0, a value of the intra-prediction mode index indicates a position corresponding to the intra prediction mode of the current block in the MPM list, in this situation, when a value of the mpm_idx is 0, then the intra prediction mode for the current block is 13, or when a value of the mpm_idx is 2, then the intra prediction mode for the current block is 20).

Embodiment 43. The method of embodiment 42, wherein the obtaining an intra prediction mode of the current block according to the MPM list for the current block and the value of the intra-prediction mode index for the current block, wherein the value of the intra-prediction mode index indicates a position, the position is corresponded to the intra prediction mode of the current block among angular intra-prediction modes in the MPM list, comprises:
wherein the MPM list comprises a value correspond to Planar intra-prediction mode, a value corresponds to DC intra-prediction mode, and a plurality of values correspond to a plurality of angular intra-prediction modes;
removing the Planar mode and DC mode from the MPM list to obtain an updated MPM list with a shrunk size (namely, two entries smaller than the original MPM list);
obtaining the intra prediction mode of the current block according to the updated MPM list and the value of the intra-prediction mode index for the current block, wherein the intra mode of the current block is the intra prediction mode which correspond to the value of the intra-prediction mode index in the updated MPM list (In an example, when the MPM list is (13, 0, 20, 1, 45, 51), the value 0 in the MPM list correspond to the Planar mode, the value 1 in the MPM list correspond to the DC mode, so the updated MPM list are (13, 20, 45, 51). When a value of the mpm_idx is 0, then the intra prediction mode for the current block is 13, or when a value of the mpm_idx is 2, then the intra prediction mode for the current block is 45).

Embodiment 44. The method of embodiment 42, wherein the obtaining an intra prediction mode of the current block according to the MPM list for the current block and the value of the intra-prediction mode index for the current block, wherein the value of the intra-prediction mode index indicates a position, the position is corresponded to the intra prediction mode of the current block among angular intra-prediction modes in the MPM list, comprises:
wherein the MPM list comprises a value (for example, 1) correspond to DC intra-prediction mode, a value (for example, 0) correspond to Planar intra-prediction mode, and a plurality of values correspond to a plurality of angular intra-prediction modes;
the intra prediction mode of the current block is obtained according to the following processes: unsigned ipred_idx_without_planar_DC=0;

```
unsigned i;
for (i = 0; i < numMPMs; i++)
{
    if (mpm_pred[i] >= 2)
    {
        if (ipred_idx_without_planar_DC == mpm_idx)
        {
            mpm_idx = i;
            break;
        }
        else
        {
            ipred_idx_without_planar_DC++;
        }
    }
}
``` wherein numMPMs is the quantity of values corresponding to intra-prediction modes in the MPM list (for example, 6), mpm_pred[i] is a value correspond to index i in the MPM list (for example, when the MPM list is (15,0,1, 20, 18,45), when i=3, mpm_pred[i] is 20; when i=0, mpm_pred[i] is 15), mpm_idx is the value of the intra-prediction mode index for the updated MPM list that excluding planar and DC modes. An iterator ipred_idx_without_planar_DC scans the MPM list to find out the real angular mode signaled. When it equals to parsed mpm_idx, the real angular mode is found, and the value of mpm_pred[mpm_idx] is equal to the value corresponding intra prediction mode of the current block.

Embodiment 45. The method of embodiment 42, wherein the obtaining an intra prediction mode of the current block according to the MPM list for the current block and the value of the intra-prediction mode index for the current block, wherein the value of the intra-prediction mode index indicates a position, the position is corresponded to the intra prediction mode of the current block among angular intra-prediction modes in the MPM list, comprises:
wherein the MPM list comprises a value (for example, 1) correspond to DC intra-prediction mode and a value (for example, 0) correspond to Planar intra-prediction mode, and a plurality of values correspond to a plurality of angular intra-prediction modes;
obtaining an angular mode position list according to the plurality of values correspond to the plurality of angular intra-prediction modes in the MPM list;

obtaining the intra prediction mode of the current block according to the angular mode position list and the value of the intra-prediction mode index for the current block, wherein the value correspond to the intra prediction mode of the current block is equal to a value correspond to position i in the angular mode position list, the value of i is equal to the value of the intra-prediction mode index for the current block.

Embodiment 46. A method of decoding implemented by a decoding device, comprising: obtaining a value of a reference line index for a current block;

constructing a most probable mode, MPM, list (In an example, the quantity of values corresponding to intra-prediction modes in the MPM list is 6) for the current block;

obtaining a value of intra-prediction mode index (mpm_idx) for the current block;

when the value of the reference line index is not equal to 0 (In an example, 0 is the first value of the reference line index), when the value of intra-prediction mode index (mpm_idx) is less than or equal to a threshold (for example, 3), obtaining an intra prediction mode of the current block according to angular modes in the MPM list for the current block and the value of the intra-prediction mode index for the current block (for example, according to the method in the above claims); or when the value of intra-prediction mode index (mpm_idx) is greater than a threshold (for example, 3), obtaining an intra prediction mode of the current block according to a default intra-prediction mode list and the value of the intra-prediction mode index for the current block.

Embodiment 47. A method of decoding implemented by a decoding device, comprising: obtaining a value of a reference line index for a current block;

constructing a most probable mode, MPM, list (In an example, the quantity of values corresponding to intra-prediction modes in the MPM list is 6) for the current block;

obtaining a value of intra-prediction mode index (mpm_idx) for the current block;

when the value of the reference line index is not equal to 0 (In an example, 0 is the first value of the reference line index), obtaining an intra prediction mode of the current block according to the MPM list for the current block and the value of the intra-prediction mode index for the current block;

when the intra prediction mode of the current block is Planar intra-prediction mode or is DC intra-prediction mode, obtaining at least one reference sample correspond to the current block according to the intra prediction mode of the current block, wherein the at least one reference sample correspond to the first reference line (In an example, when the value of the reference line index is not equal to 0, if the intra mode is planar or DC mode, change the reference samples as if reference line index equals to 0).

Embodiment 48. A decoder (30) comprising processing circuitry for carrying out the method according to any one of embodiments 42 to 47.

Embodiment 49. A computer program product comprising a program code for performing the method according to any one of embodiments 42 to 47.

Embodiment 50. A decoder, comprising:
one or more processors; and
a non-transitory computer-readable storage medium coupled to the processors and storing programming for execution by the processors, wherein the programming, when executed by the processors, configures the decoder to carry out the method according to any one of embodiments 42 to 47.

Following is an explanation of the applications of the encoding method as well as the decoding method as shown in the above-mentioned embodiments, and a system using them.

Figure 17:
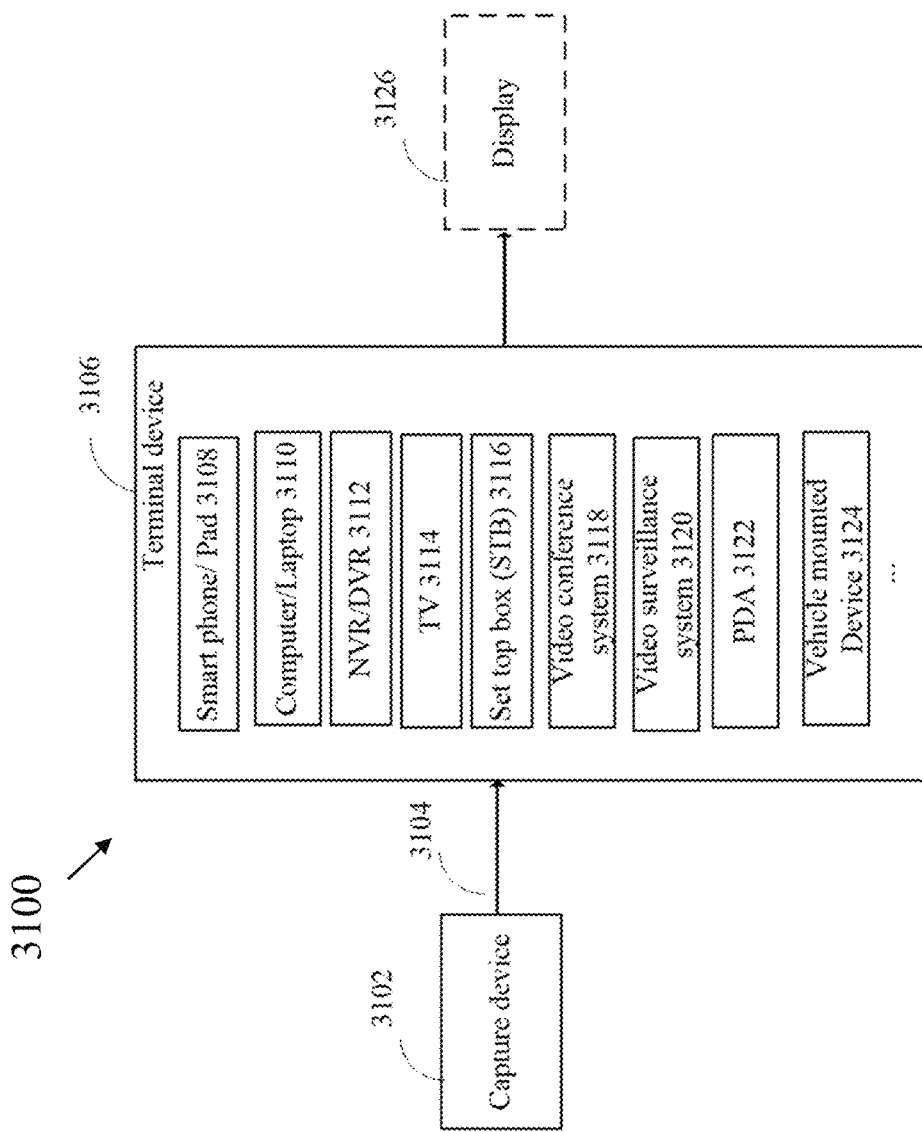
FIG. 17 is a block diagram showing an example structure of a content supply system 3100 which realizes a content delivery service.

FIG. 17 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 3106 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device 3106 is prioritized to perform video decoding. When the encoded data includes audio, an audio decoder included in the terminal device 3106 is prioritized to perform audio decoding processing.

For a terminal device with its display, for example, smart phone or pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 18:
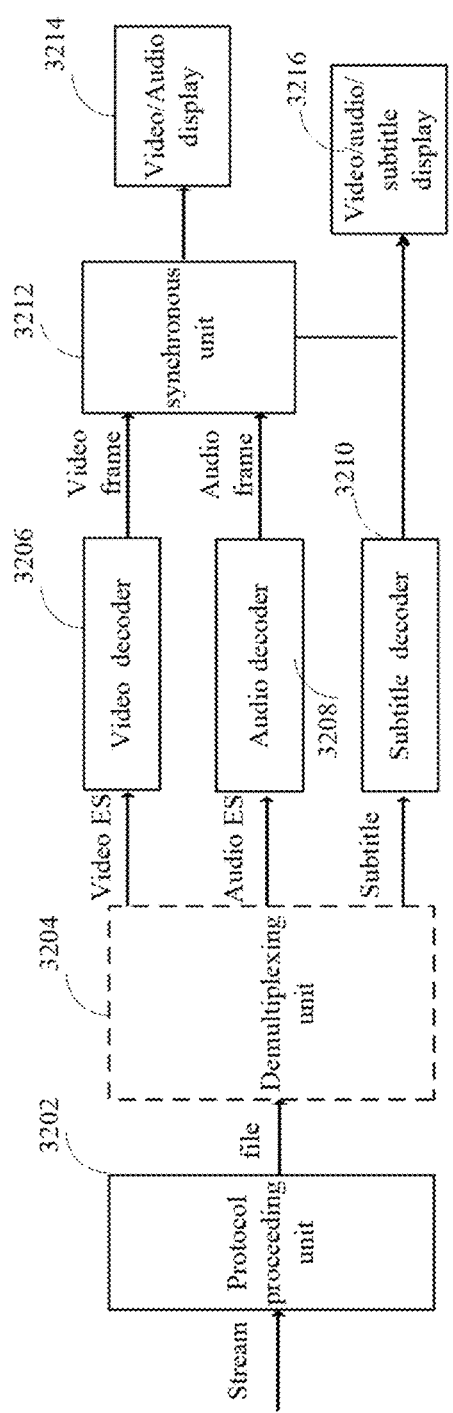
FIG. 18 is a block diagram showing a structure of an example of a terminal device.

FIG. 18 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

Embodiments of the disclosure is not limited to the above-mentioned system, and either the picture encoding device or the picture decoding device in the above-mentioned embodiments can be incorporated into other system, for example, a car system.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

What is claimed is:

1. A method of video decoding implemented by a decoding device, the method comprising:
    obtaining a value of a reference line index for a current block;
    constructing a most probable mode (MPM) list for the current block;
    obtaining a value of intra-prediction mode index for the current block;
    when the value of the reference line index is not equal to 0,
        obtaining an intra prediction mode of the current block according to the MPM list for the current block and the value of the intra-prediction mode index for the current block, wherein the value of the intra-prediction mode index indicates a position that corresponds to the intra prediction mode of the current block among angular intra-prediction modes in the MPM list;
    obtaining prediction values for the current block according to the intra prediction mode of the current block and reference samples of neighboring blocks adjacent to the current block; and
    obtaining reconstructed sample values of the current block according to the prediction values for the current block;
    wherein the MPM list comprises a value corresponding to a DC intra-prediction mode, a value corresponding to a planar intra-prediction mode, and a plurality of values corresponding to a plurality of angular intra-prediction modes;
    wherein obtaining the intra prediction mode of the current block comprises:
    obtaining an angular mode position list according to the plurality of values corresponding to the plurality of angular intra-prediction modes in the MPM list; and
    obtaining the intra prediction mode of the current block according to the angular mode position list and the value of the intra-prediction mode index for the current block, wherein a value corresponding to the intra prediction mode of the current block is equal to a value corresponding to a position i in the angular mode position list, i is equal to the value of the intra-prediction mode index for the current block.

2. The method of claim 1, wherein
    the MPM list comprises a value corresponding to a planar intra-prediction mode, a value corresponding to DC intra-prediction mode, and a plurality of values corresponding to a plurality of angular intra-prediction modes;
    obtaining the intra prediction mode of the current block comprises:
    removing the planar intra-prediction mode and the DC intra-prediction mode from the MPM list to obtain an updated MPM list; and
    obtaining the intra prediction mode of the current block according to the updated MPM list and the value of the intra-prediction mode index for the current block, wherein the intra prediction mode of the current block corresponds to a value of intra-prediction mode index in the updated MPM list.

3. A non-transitory machine-readable medium having instructions stored therein, which when executed by a processor, cause the processor to perform operations, the operations comprising:
    obtaining a value of a reference line index for a current block;
    constructing a most probable mode (MPM) list for the current block;
    obtaining a value of intra-prediction mode index for the current block;
    when the value of the reference line index is not equal to 0,
        obtaining an intra prediction mode of the current block according to the MPM list for the current block and the value of the intra-prediction mode index for the current block, wherein the value of the intra-prediction mode index indicates a position that corresponds to the intra prediction mode of the current block among angular intra-prediction modes in the MPM list;

obtaining prediction values for the current block according to the intra prediction mode of the current block and reference samples of neighboring blocks adjacent to the current block; and obtaining reconstructed sample values of the current block according to the prediction values for the current block;

wherein the MPM list comprises a value corresponding to a DC intra-prediction mode, a value corresponding to a planar intra-prediction mode, and a plurality of values corresponding to a plurality of angular intra-prediction modes;

wherein obtaining the intra prediction mode of the current block comprises:

obtaining an angular mode position list according to the plurality of values corresponding to the plurality of angular intra-prediction modes in the MPM list; and obtaining the intra prediction mode of the current block according to the angular mode position list and the value of the intra-prediction mode index for the current block, wherein a value corresponding to the intra prediction mode of the current block is equal to a value corresponding to a position i in the angular mode position list, i is equal to the value of the intra-prediction mode index for the current block.

4. The non-transitory machine-readable medium of claim 3, wherein the MPM list comprises a value corresponding to a planar intra-prediction mode, a value corresponding to a DC intra-prediction mode, and a plurality of values corresponding to a plurality of angular intra-prediction modes;

obtaining the intra prediction mode of the current block comprises:

removing the planar intra-prediction mode and the DC intra-prediction mode from the MPM list to obtain an updated MPM list; and obtaining the intra prediction mode of the current block according to the updated MPM list and the value of the intra-prediction mode index for the current block, wherein the intra prediction mode of the current block corresponds to a value of intra-prediction mode index in the updated MPM list.

5. A decoder, comprising:

one or more processors; and a non-transitory computer-readable storage medium coupled to the processors to store instructions, which when executed by the processors, cause the processors to perform operations, the operations including:

obtaining a value of a reference line index for a current block;

constructing a most probable mode (MPM) list for the current block;

obtaining a value of intra-prediction mode index for the current block;

when the value of the reference line index is not equal to 0, obtaining an intra prediction mode of the current block according to the MPM list for the current block and the value of the intra-prediction mode index for the current block, wherein the value of the intra-prediction mode index indicates a position that corresponds to the intra prediction mode of the current block among angular intra-prediction modes in the MPM list;

obtaining prediction values for the current block according to the intra prediction mode of the current block and reference samples of neighboring blocks adjacent to the current block; and obtaining reconstructed sample values of the current block according to the prediction values for the current block;

wherein the MPM list comprises a value correspond to DC intra-prediction mode and a value correspond to Planar intra-prediction mode, and a plurality of values correspond to a plurality of angular intra-prediction modes;

wherein obtaining the intra prediction mode of the current block comprises:

obtaining an angular mode position list according to the plurality of values correspond to the plurality of angular intra-prediction modes in the MPM list; and obtaining the intra prediction mode of the current block according to the angular mode position list and the value of the intra-prediction mode index for the current block, wherein the value correspond to the intra prediction mode of the current block is equal to a value correspond to position i in the angular mode position list, the value of i is equal to the value of the intra-prediction mode index for the current block.

6. The decoder of claim 5, wherein the MPM list comprises a value corresponding to a planar intra-prediction mode, a value corresponding to a DC intra-prediction mode, and a plurality of values correspond to a plurality of angular intra-prediction modes;

obtaining the intra prediction mode of the current block comprises:

removing the planar intra-prediction mode and the DC intra-prediction mode from the MPM list to obtain an updated MPM list;

obtaining the intra prediction mode of the current block according to the updated MPM list and the value of the intra-prediction mode index for the current block, wherein the intra prediction mode of the current block corresponds to a value of the intra-prediction mode index in the updated MPM list.

* * * * *